United States Patent [19]

Meyer et al.

[11] Patent Number: 5,933,812
[45] Date of Patent: Aug. 3, 1999

[54] PORTABLE TRANSACTION TERMINAL SYSTEM

[75] Inventors: Lee Meyer, Carmichael; James D. Fuller, Auburn; David C. Hanley, Colfax; Willie Yuen Fong, San Francisco; Gary L. Specht, Rocklin; Michael Fischer, Auburn; Paul A. Serotta, Roseville; William B. Cole, Meadow Vista, all of Calif.

[73] Assignee: Verifone Inc., Santa Clara, Calif.

[21] Appl. No.: 08/419,676

[22] Filed: Apr. 12, 1995

[51] Int. Cl.$^6$ ..................................................... G06K 19/10
[52] U.S. Cl. ........................... 705/15; 235/380; 235/483; 235/485; 361/679; 361/686; 364/705.06; 364/709.04; 364/710.04; 705/16; 705/17
[58] Field of Search ..................................... 235/435, 449, 235/482, 483, 485, 375, 379, 380; 200/5 A; 361/679, 686; 364/705.06, 709.04, 710.04; 395/201, 215, 216, 217, 221, 224, 225; 705/1, 15, 16, 17, 21, 24, 25

[56] References Cited

U.S. PATENT DOCUMENTS

| | | | |
|---|---|---|---|
| 3,394,246 | 7/1968 | Goldman | 235/380 |
| 4,415,065 | 11/1983 | Sandstedt | 395/234 |
| 4,532,416 | 7/1985 | Berstein | 235/379 |
| 4,558,270 | 12/1985 | Liautaud et al. | 320/2 |
| 4,569,421 | 2/1986 | Sandstedt | 186/39 |
| 4,609,860 | 9/1986 | Fasen | 320/14 |
| 4,667,299 | 5/1987 | Dunn | 364/708.1 |
| 4,722,054 | 1/1988 | Yorozu et al. | 395/217 |
| 4,773,032 | 9/1988 | Uehara et al. | 364/709.04 |
| 4,788,420 | 11/1988 | Chang et al. | 235/483 |
| 4,916,262 | 4/1990 | Jungels-Butler et al. | 200/5 A |
| 4,969,097 | 11/1990 | Levin | 395/796 |

(List continued on next page.)

FOREIGN PATENT DOCUMENTS 1019702  2/1966  United Kingdom .

OTHER PUBLICATIONS

"Debit Comes to Dinner"; *Credit Card Management*; Jul. 1993; p. 13; Dialog: File 16, Acc# 04705463.

"Verifone Folio (TM) Brings Credit and Debit Card Payment to the Restaurant Table"; *PR Newswire*, p0516SJ003; May 16, 1994; Dialog: File 148, Acc# 07255117.

(List continued on next page.)

*Primary Examiner*—Stephen R. Tkacs
*Attorney, Agent, or Firm*—Lowell C. Bergstedt

[57] ABSTRACT

Portable transaction terminal apparatus adapted for use in eating and drinking establishments. A terminal housing has a generally rectangular shape and a size slightly larger in length and width to corresponding dimensions of a restaurant guest check. A folio-type cover is mounted to a left side portion of the terminal housing by a hinge arrangement and thereby adapted to swing between open and closed cover positions, the cover corresponding in length and width to the terminal housing so as to completely cover a top face of the terminal housing in the closed cover position and to lie flat against a surface in the open cover position. A data entry keypad and an alphanumeric display are carried on the top face of the terminal housing. A card reader module is mounted in the terminal housing for accepting and reading a transaction data card selected for use by a guest of the establishment for payment of the amount of the guest check. A microcomputer system is carried within the terminal housing and being pre-programmed with operating system and application software for management of data entry, message display, card reading and transaction message formatting and storing functions associated with a preselected data entry sequence and data message format. The microcomputer system communicates a transaction data message to an external transaction terminal system for completion of transaction processing steps. A docking station is provided for communication with a transaction terminal. Recharging stations with intelligent charge controllers are provided for recharging the batteries of the portable transaction terminal.

13 Claims, 18 Drawing Sheets

U.S. PATENT DOCUMENTS

| | | | |
|---|---|---|---|
| 5,054,112 | 10/1991 | Ike | 455/41 |
| 5,057,677 | 10/1991 | Bertagna et al. | 395/217 |
| 5,128,829 | 7/1992 | Loew | 361/683 |
| 5,191,198 | 3/1993 | Do | 235/483 |
| 5,195,133 | 3/1993 | Kapp et al. | 380/9 |
| 5,230,074 | 7/1993 | Canova, Jr. et al. | 395/750 |
| 5,237,487 | 8/1993 | Dittmer et al. | 361/683 |
| 5,297,202 | 3/1994 | Kapp et al. | 380/9 |
| 5,317,691 | 5/1994 | Traeger | 364/550 |

OTHER PUBLICATIONS

Barthel; "Verifone Offers Portable Restaurant POS System"; *American Banker*; v159 n99; p.12(1); May 24, 1994; Dialog: File 148, Acc# 07285851.

"Enter VeriFone"; *POS News*; Jun. 1, 1994; Dialog; File 636, Acc# 02394725.

Ruggless; "When Software is as Important as Flatware"; *Nation's Restaurant News*; v28 n37; p. 136(3); Sep. 19, 1994; Dialog: file 148, Acc# 07534179.

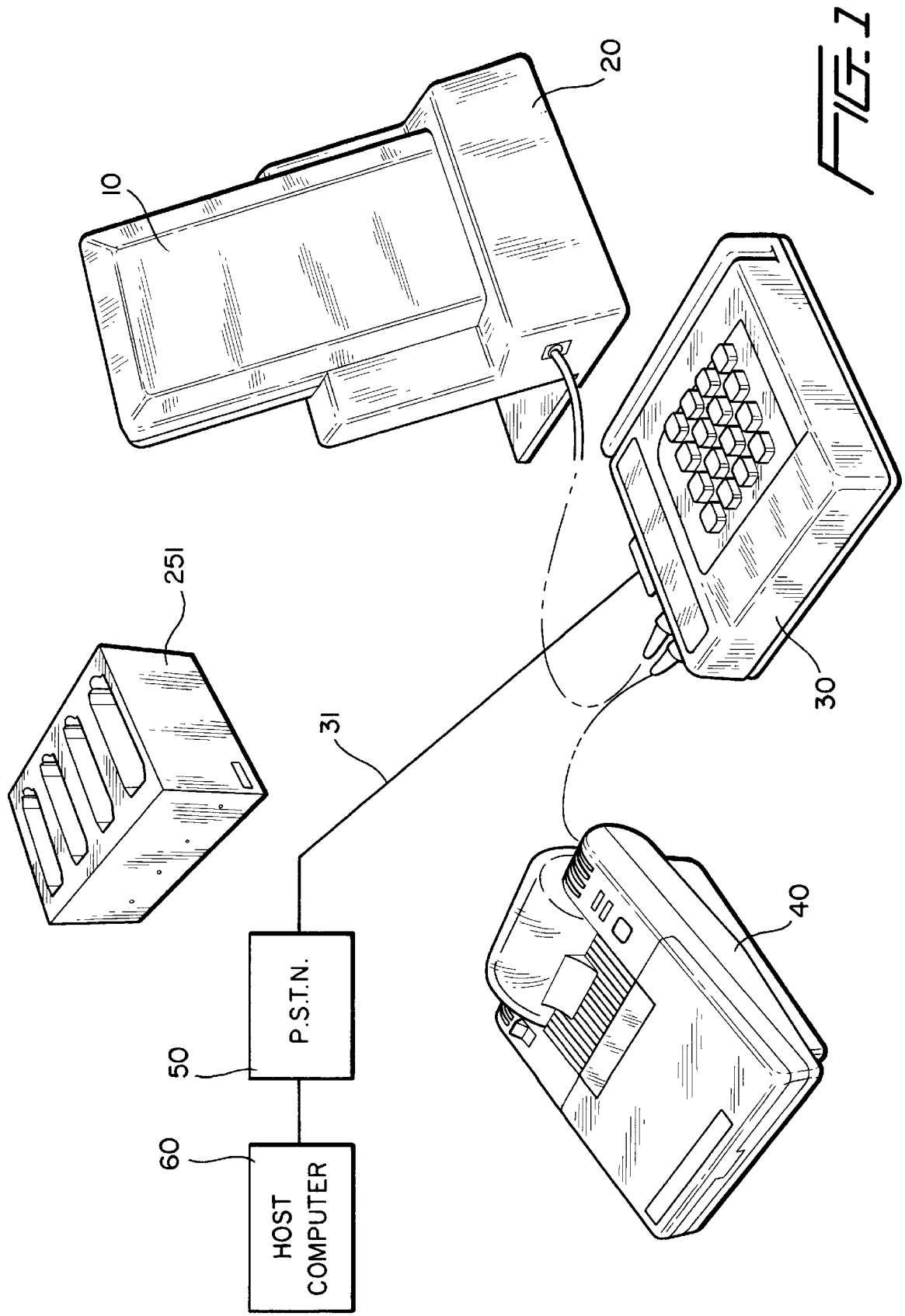

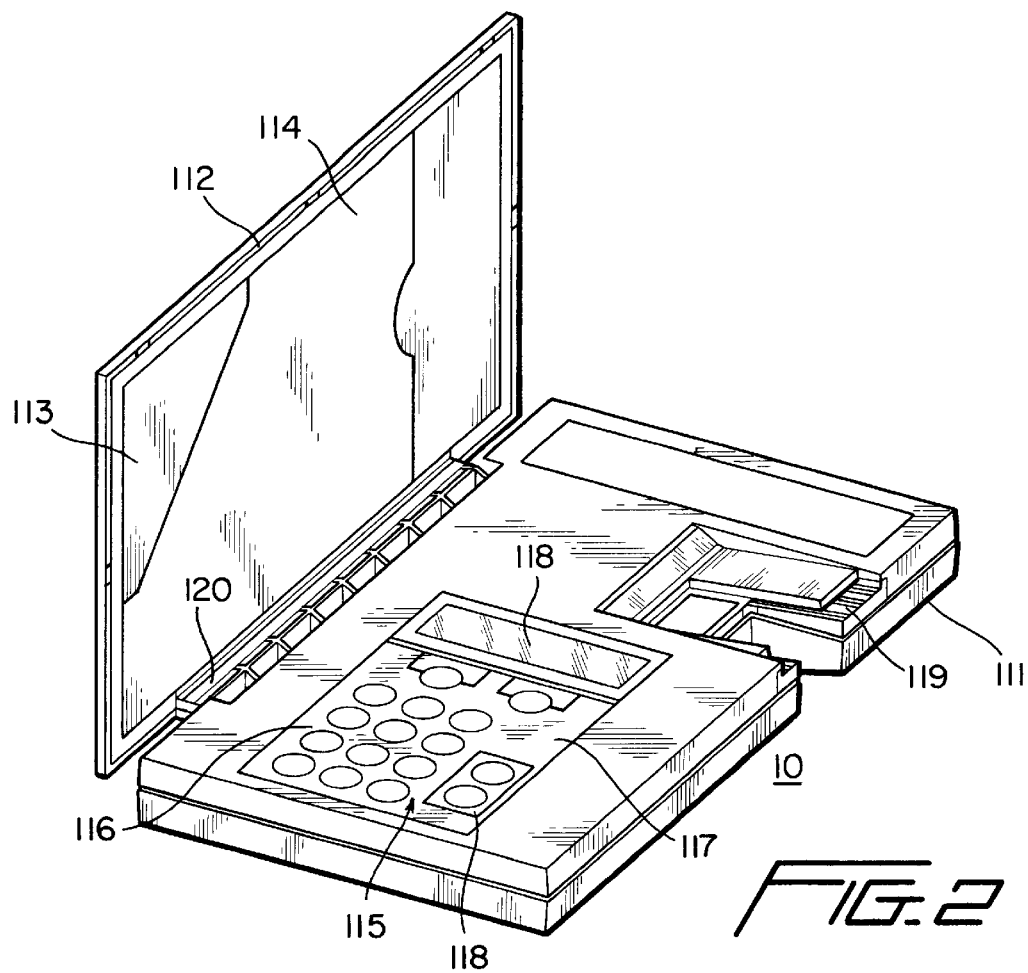
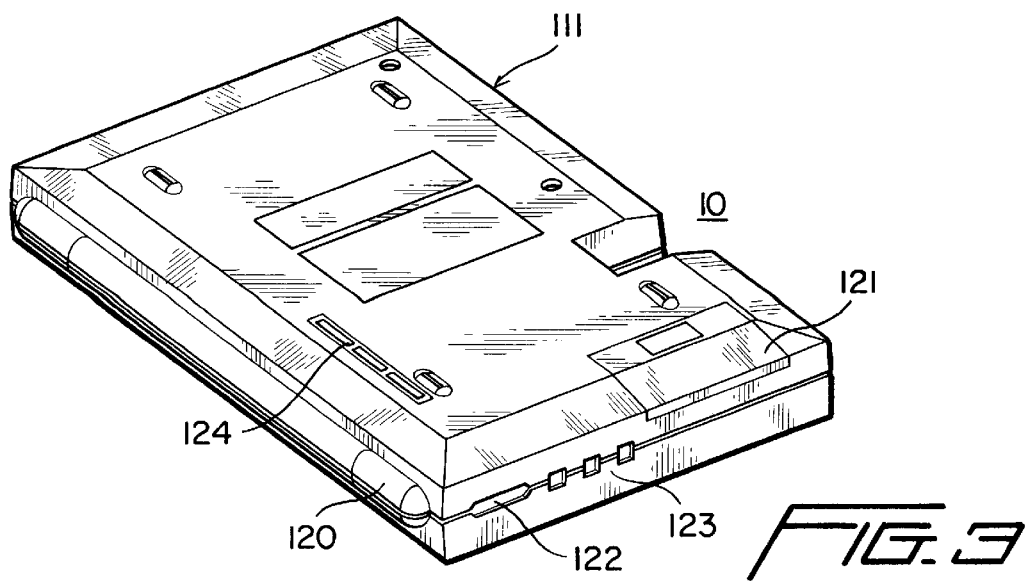

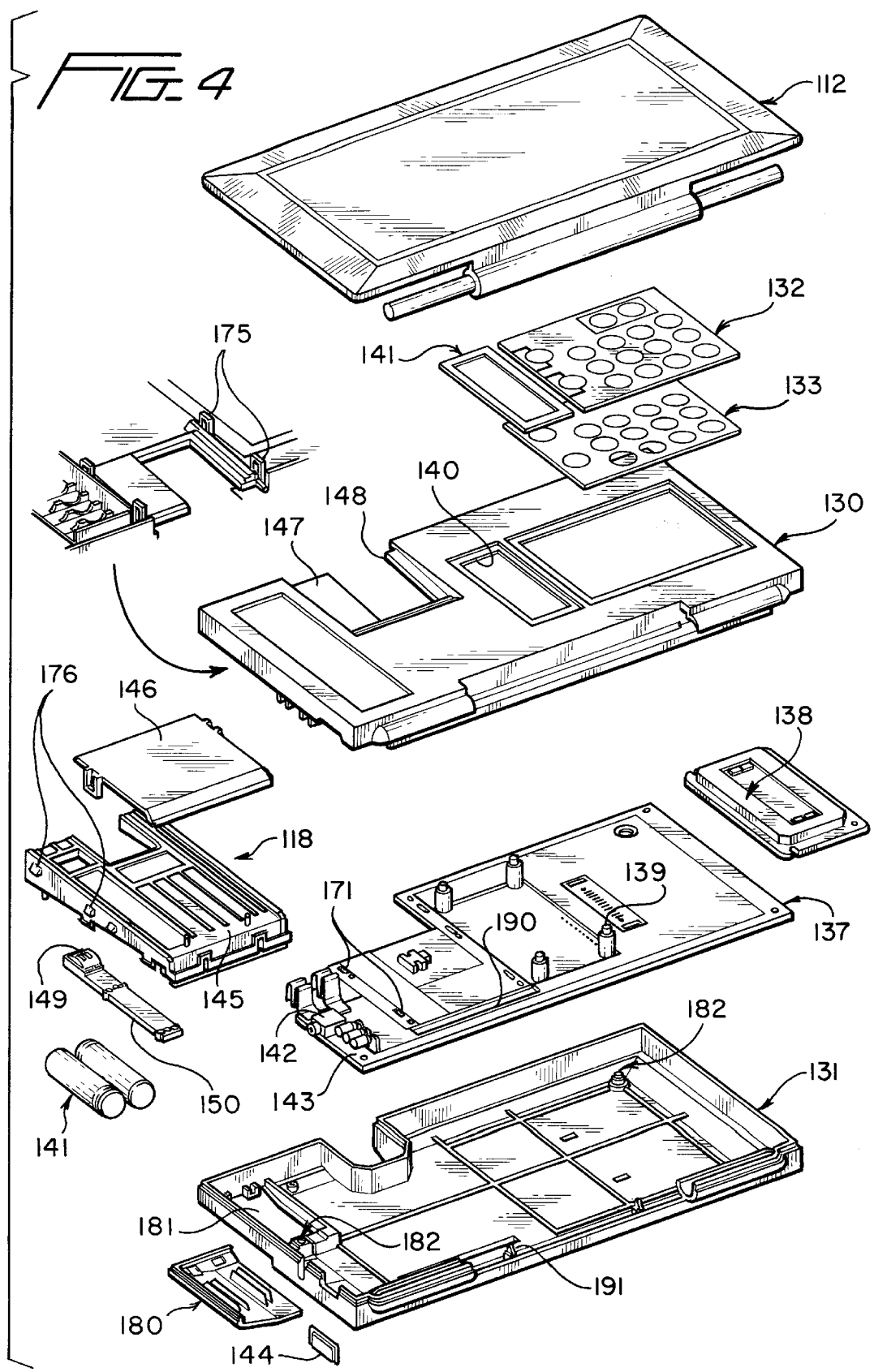

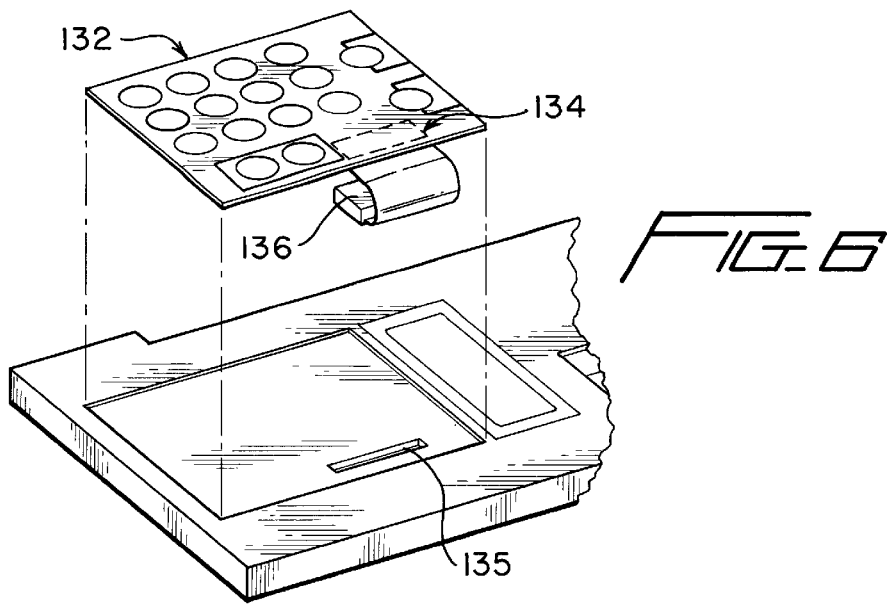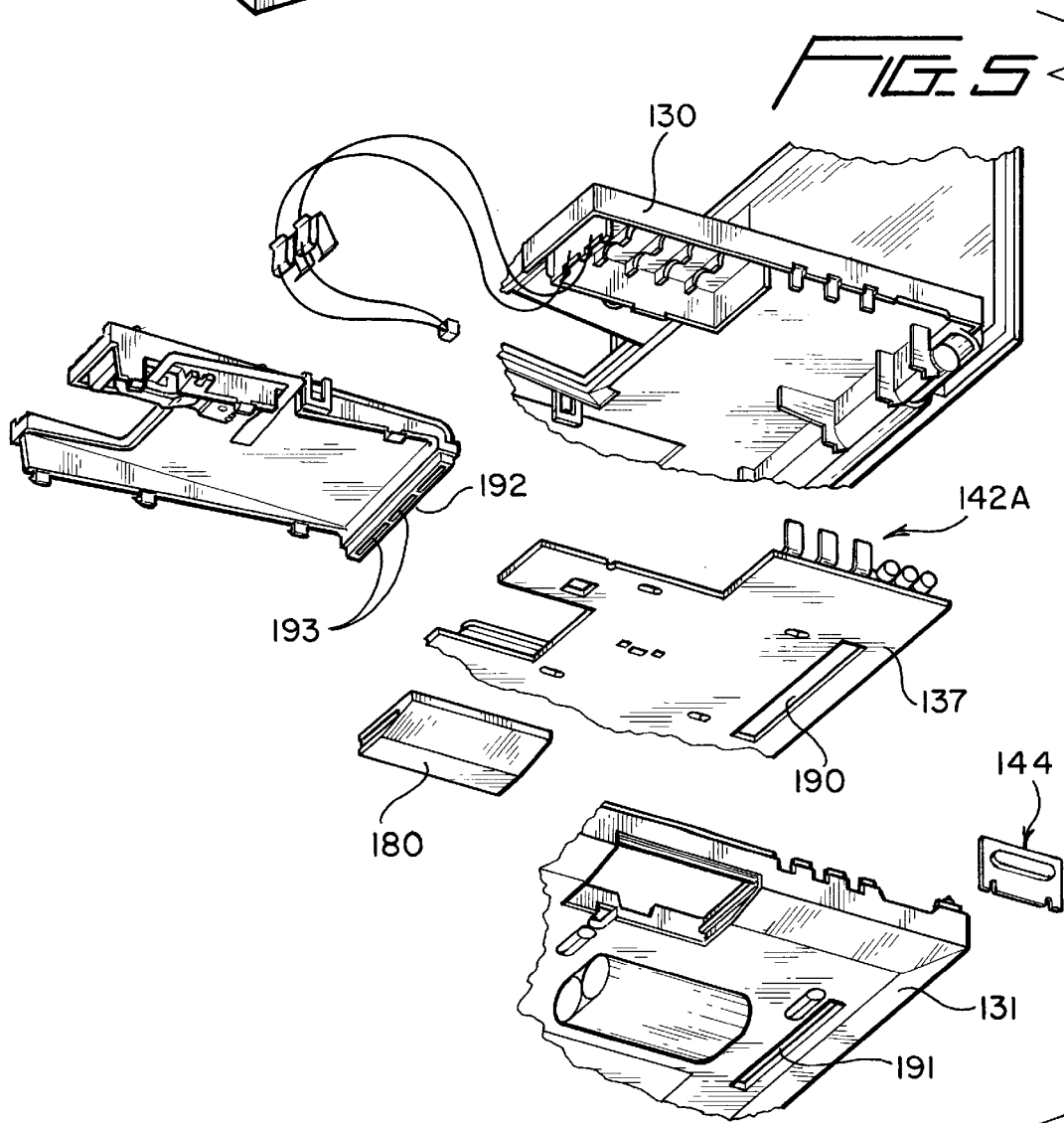

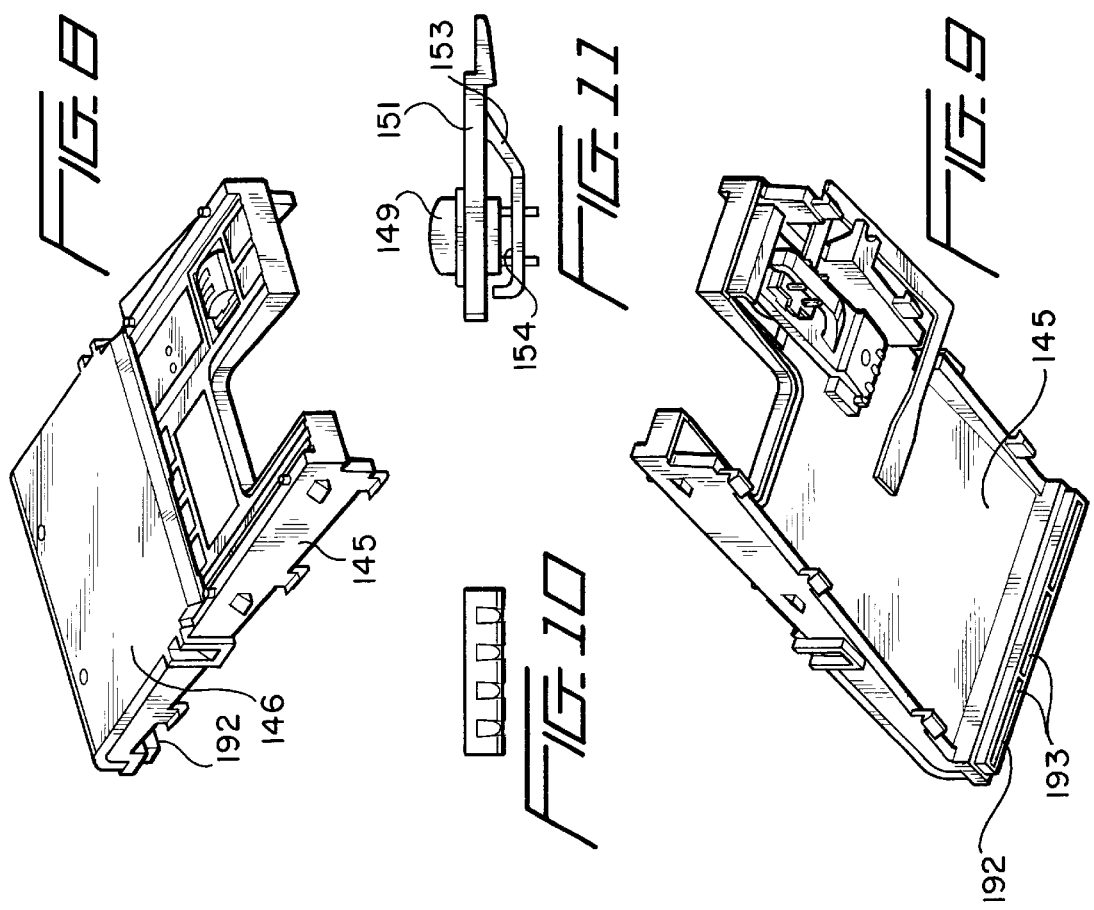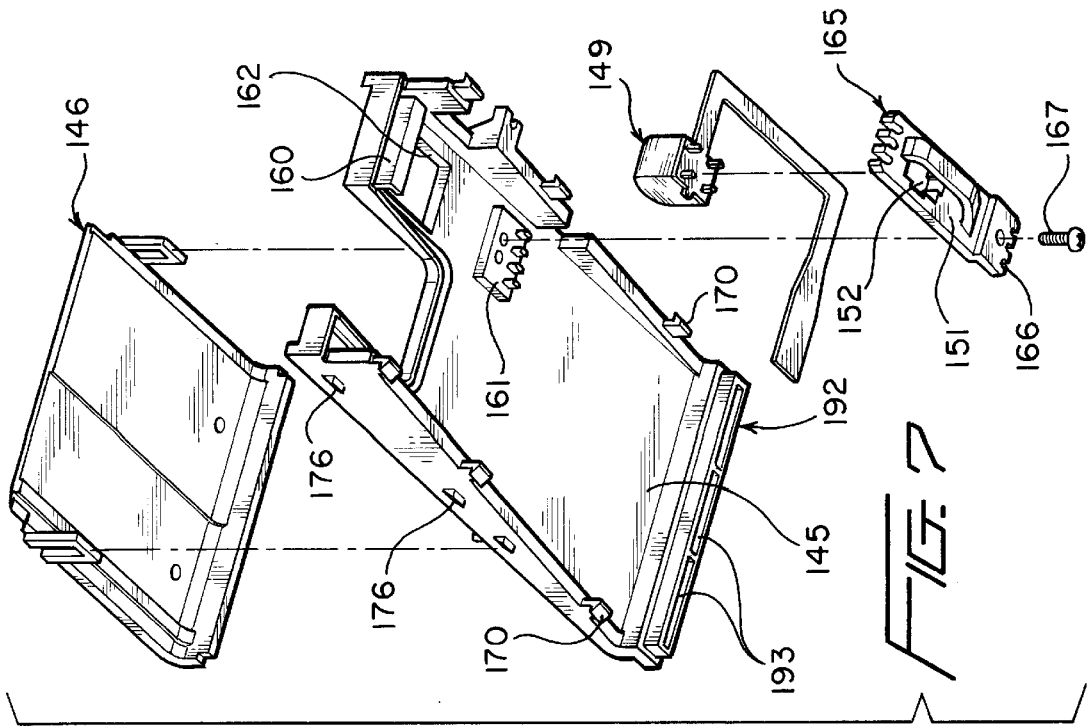

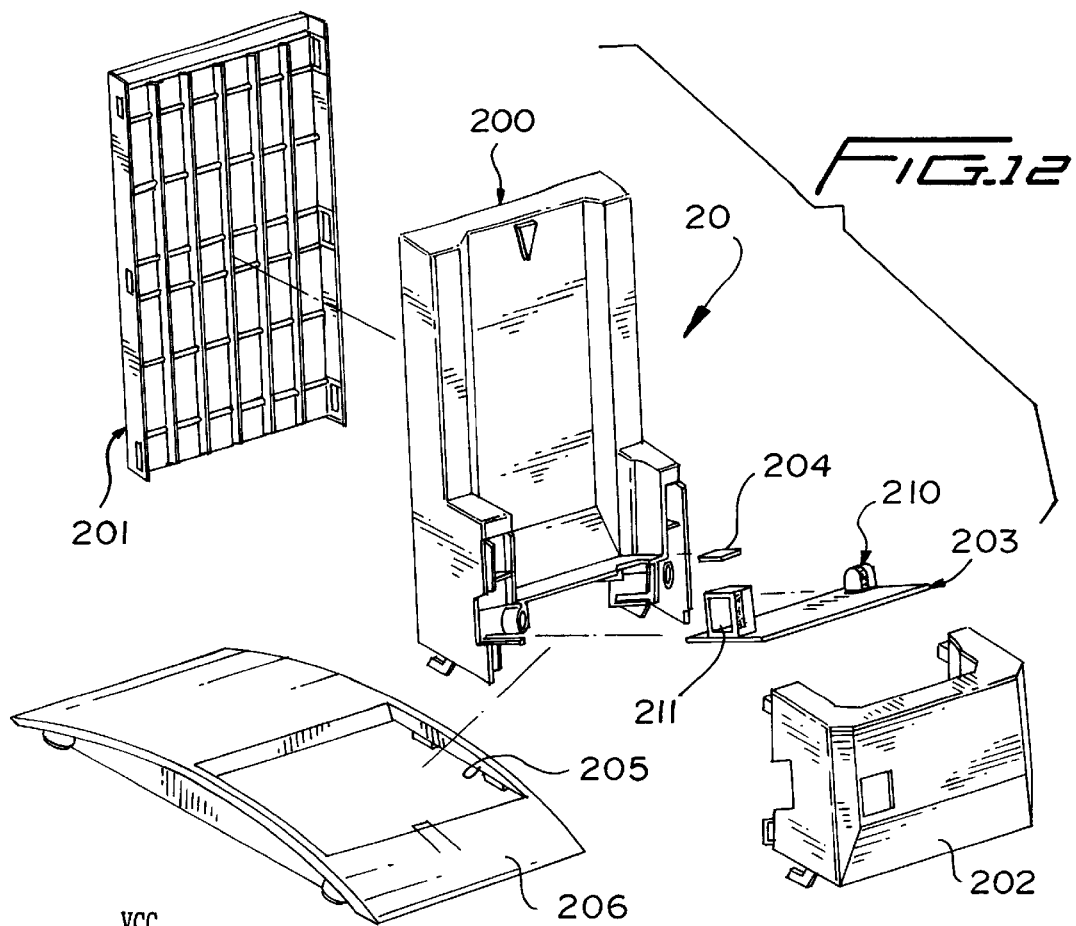
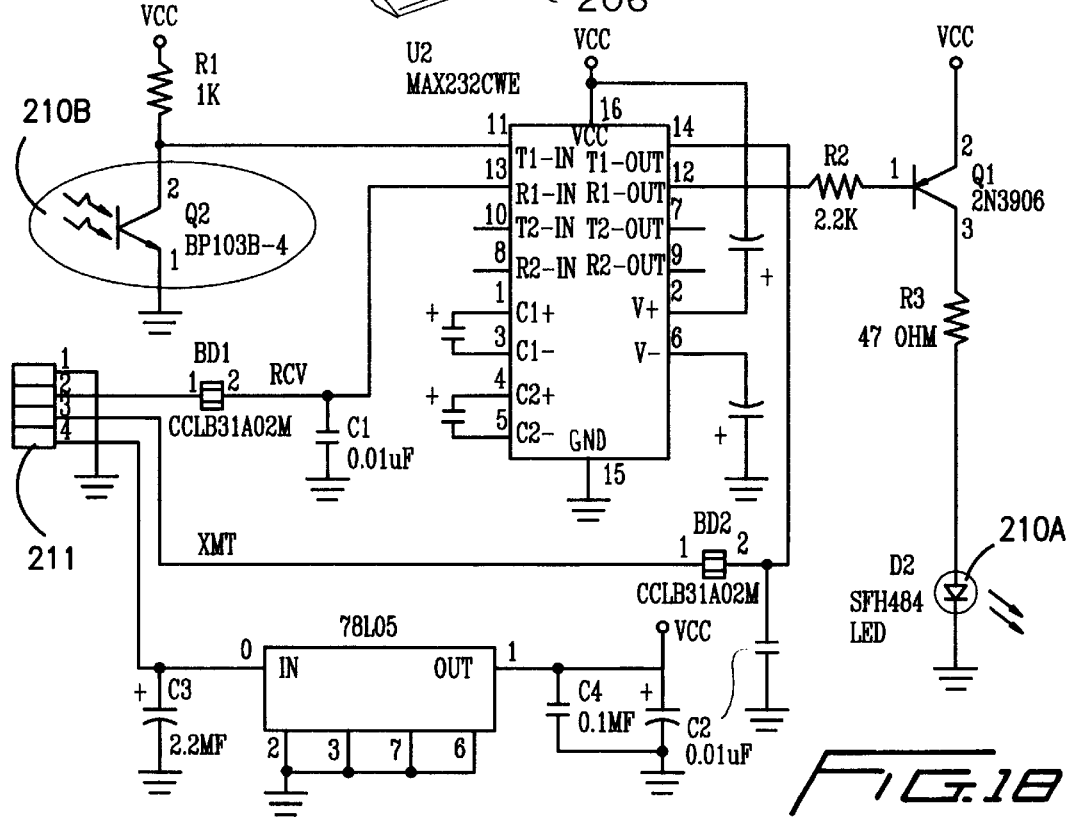

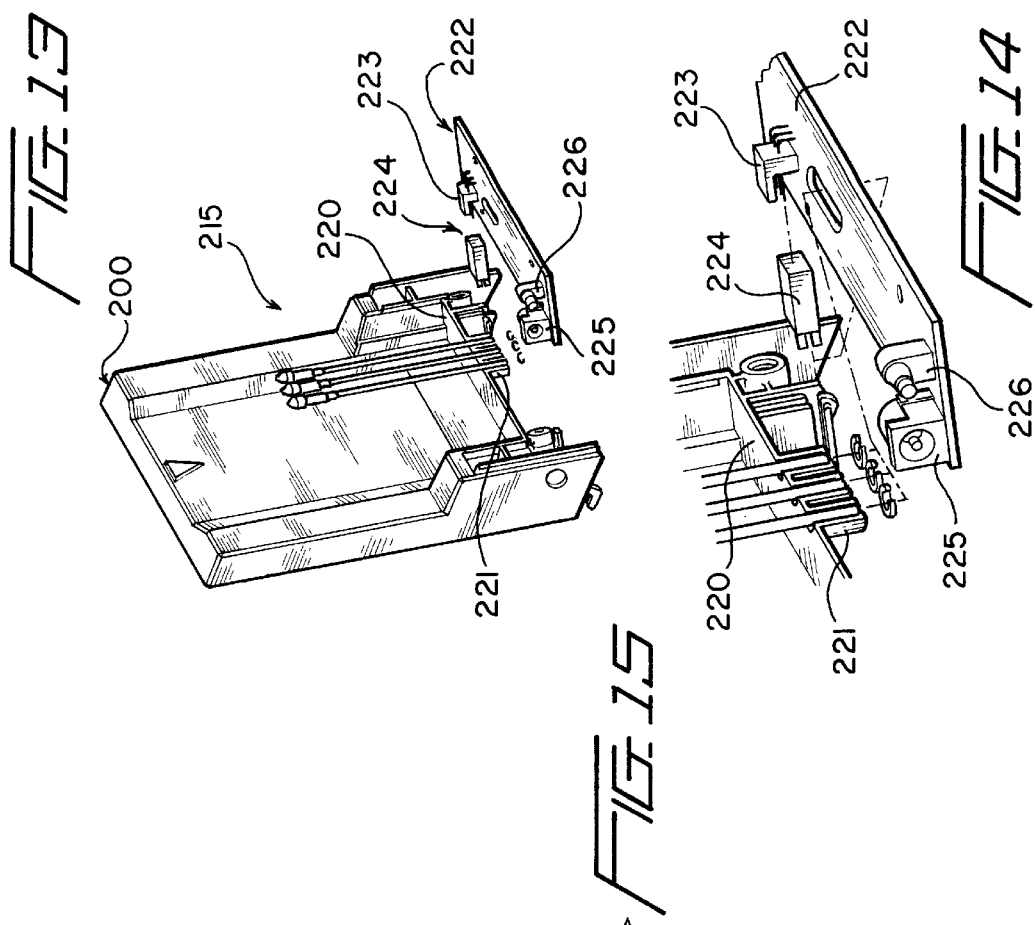
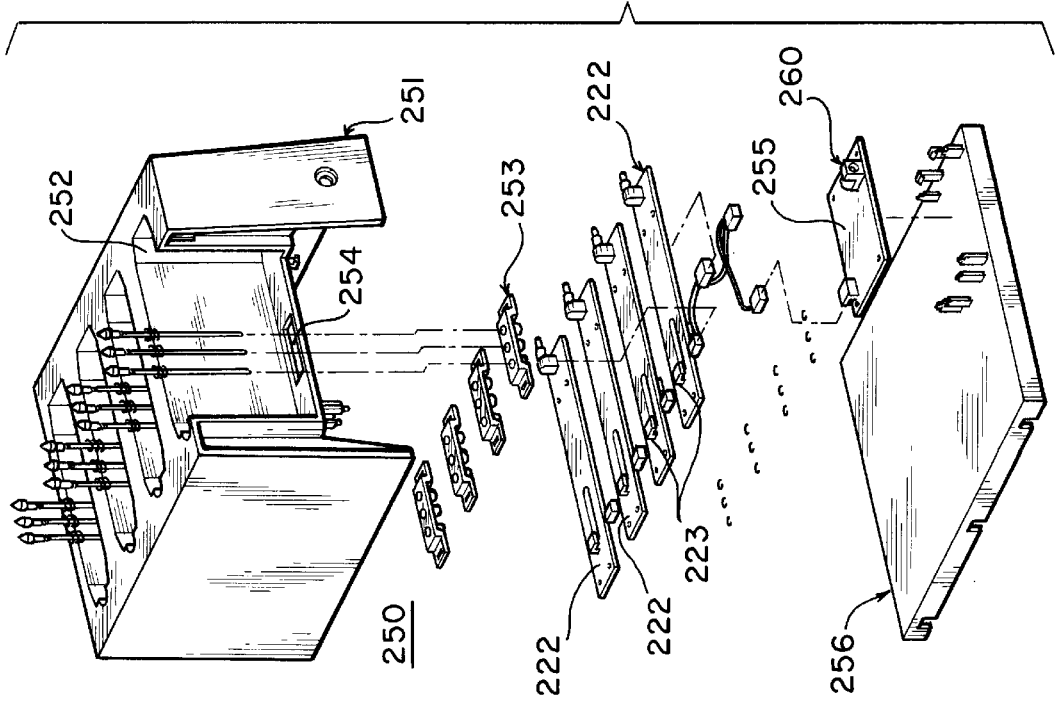

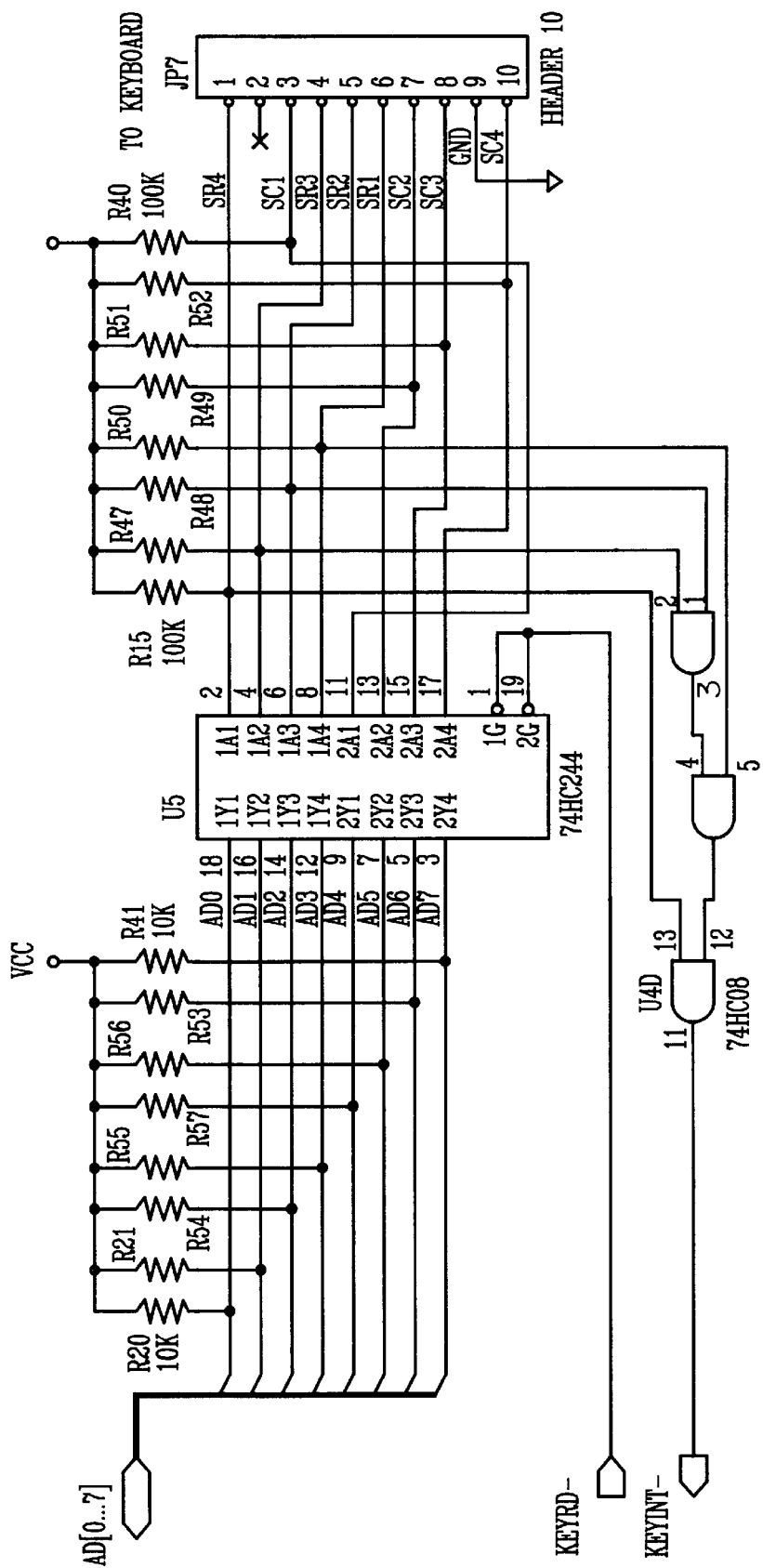

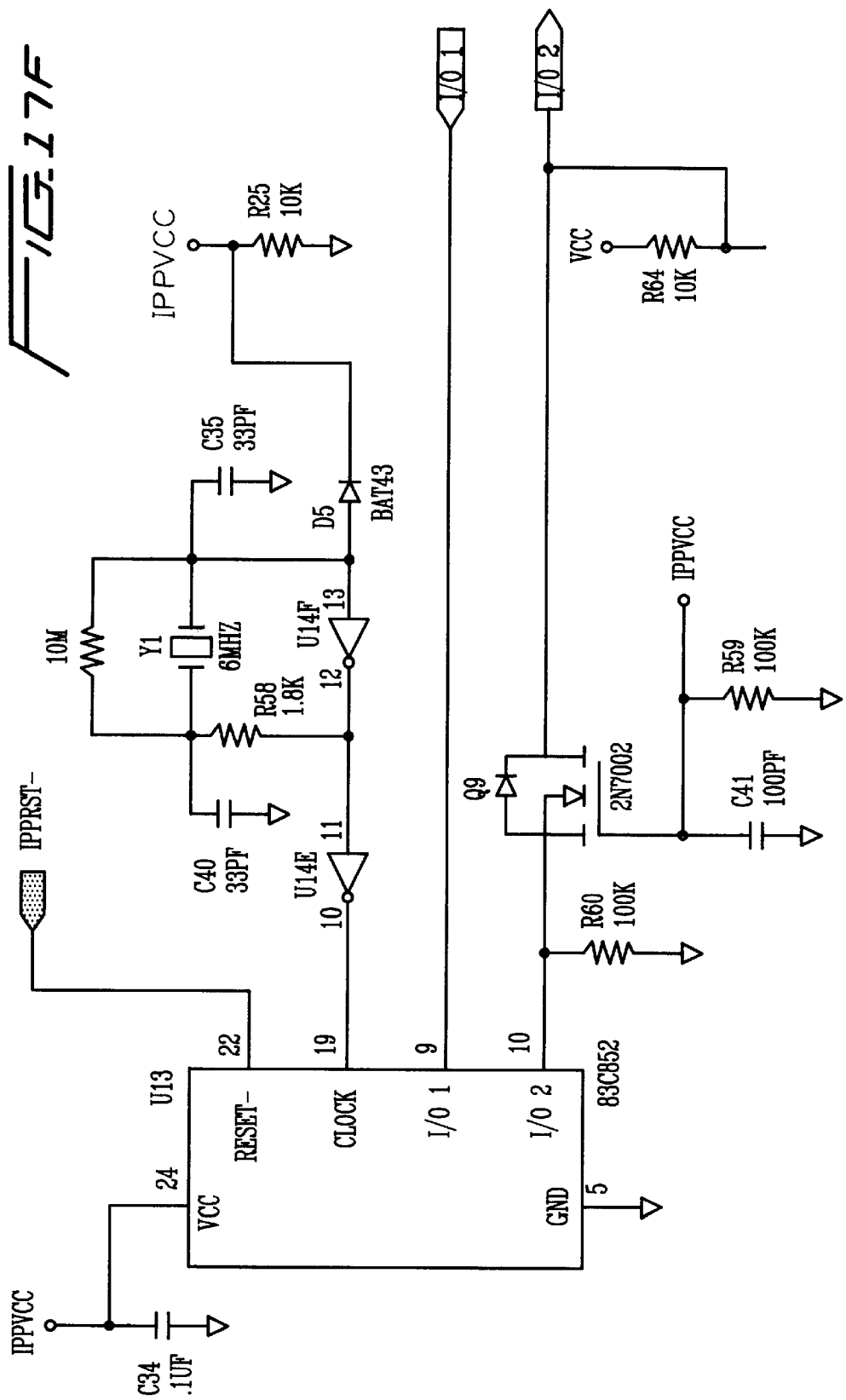

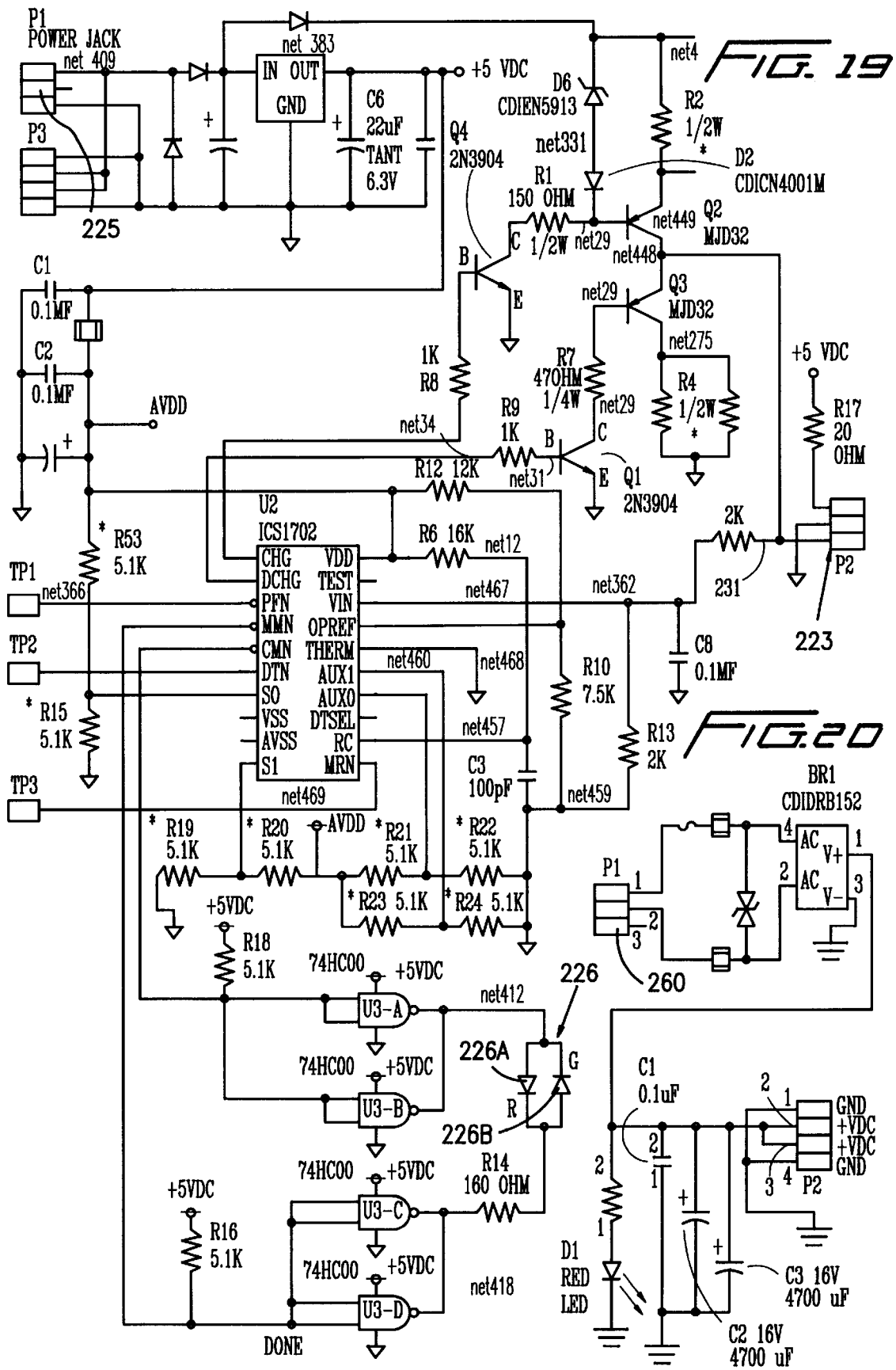

PORTABLE TRANSACTION TERMINAL SYSTEM

CROSS-REFERENCE TO RELATED APPLICATIONS

Co-pending and commonly assigned Drugge et al, U.S. patent application Ser. No. 29/030,476, now U.S. Pat. No. D364,391, is a design patent on the aesthetic design features of a commercial version of a portable transaction terminal which incorporates features of this invention.

FIELD OF THE INVENTION

This invention relates in general to point-of-sale transaction terminals and to portable data entry terminals. More specifically this invention relates to portable transaction data entry terminals especially adapted for use in eating and drinking establishments for payment of guest charges using credit and/or debit (ATM) cards.

BACKGROUND OF THE INVENTION—PRIOR ART

The basic concept of using a point of transaction terminal communicating with a host computer to automate credit verification as an alternative to manual verification via a voice telephone call goes back to the 1960s.

Goldman U.S. Pat. No. 3,394,246, entitled "Status Indicating System," discloses a credit verification system related to check cashing information using card reader to identify the person with the terminal on line to central station where information on the persons credit activity and check cashing activity is kept.

In February 1966, Jones U.K. Patent Specification 1,019,702, entitled "Apparatus for Use in Connection with the Sale of Articles" was published. This British application discloses a local sales terminal networked to central processing computer station and included a card reader at the terminal used for credit card reading and a TAG reading device relating to goods being sold. The TAG reading operation results in code sent to central unit for price look up (PLU) and central unit sends back description and price for printing on a sales receipt. The credit card reader provides customer credit data and the terminal communicates with the the central unit which has negative file storage for checking credit card data against a "blacklist" which is now typically called a "negative file."

Although the concept of credit transaction automation or credit verification using a local terminal communicating with a remote host has been around for several decades, it wasn't until the mid-1980's that a low cost credit verification terminal was developed. This type of transaction terminal is shown in Chang et al. U.S. Pat. No. 4,788,420. This terminal promoted the widespread use of on-line credit verification by making the point of sale terminals affordable to small businesses.

The transaction terminal in eating/drinking establishments.

The Credit Card Transaction

Transaction terminals are often used in eating and drinking establishments for payment of the guest check by credit card. Referring to FIG. 1, a transaction terminal 30 is shown connected to a receipt or charge slip printer 40. This is a typical prior art transaction automation system. (Portable terminal 10 and docking station 20 are part of this invention and not part of the prior art.) Transaction terminal 30 also has a phone line connection 31 to the public switched telephone network (P.S.T.N.) for communicating with a host computer 60. Typically, this transaction terminal equipment is operated by a clerk or employee of a business establishment who receives a transaction data card (credit card or ATM card) from the customer, swipes the card through the card reader of the transaction terminal 30 and then returns the card to the customer.

Other point-of-sale transaction terminal environments use a separate terminal or PIN-Pad operated by the customer to enter a PIN code or to swipe the transaction data card and enter a PIN code if required. In the former case the card is always within sight of the customer when out of his/her possession; and, in the later case, the card never leaves the possession of the customer.

The point-of-sale transaction environment of an eating or drinking establishment is different in that the guest remains seated while the server takes the transaction data card to the transaction terminal for performing the steps of swiping the card and entering the total of the transaction. Typically, the server brings the guest check in a guest check folio to the table and leaves it. The guest puts his/her credit card in the folio to signal payment by that method. The server returns to take the folio and card to the transaction terminal, and brings back the printed charge slip for the guest to enter a tip and sign. The server then takes the signed slip back to the transaction terminal and, at some point, the amount of the tip must then be added to the amount of the guest check at the transaction terminal for completing the total credit card charge to the guest's account.

This process is time consuming and inefficient. Further the credit card is out of sight of the customer for a period of time and this is worrisome to some people, especially if they have experienced fraudulent use of their credit card in the past.

Debit (ATM) Card Transactions

Transaction terminals have increasingly been deployed to perform debit (ATM) card transactions in which the amount of the transaction is directly debited to the customer's bank account in an online transaction. Debit transactions generally require the customer to enter a PIN code on a PIN-Pad associated with the transaction terminal. Accordingly, debit card transactions are not typically offered as a payment methodby eating and drinking establishments because the customer would be required to leave the table and go to the transaction terminal site to enter the PIN.

From this discussion it is apparent that eating and drinking establishments would benefit from having the ability to perform transaction data entry, including PIN code entry, at the guest table.

The prior art offers only partial solutions to the needs of eating and drinking establishments for a comprehensive and easy to use transaction automation solution that enables both debit and credit transaction data entry at the guest table.

One potential solution would be to bring an entire portable terminal with card reader and printer to the guest table. While portable, such terminals are still heavy and large enough that a server would not be able to carry one around in a serving apron.

U.S. Pat. No. 4,722,054 discloses a portable device for inputting partial transaction data, including card reader and PIN entry keyboard. This device has no facility for entering the transaction total or other transaction data elements such as a gratuity.

U.S. Pat. No. 4,532,416 discloses a portable PIN pad which allows a customer to enter a PIN code and avoid walking over to the transaction terminal to enter this data, but the server still has to carry the card and this portable device to the transaction terminal to enter the other transaction data.

OBJECTS OF THIS INVENTION

It is the principal object of this invention to provide a portable transaction data entry terminal that is especially suited for eating and drinking establishments.

It is another object of this invention to provide a portable terminal system which permits the guest of an establishment to enter transaction data in a convenient and user-friendly manner, including reading the transaction data card.

It is another object of this invention to provide a portable terminal system which is resistant to liquid spills.

FEATURES AND ADVANTAGES OF THIS INVENTION

One aspect of this invention features a portable transaction terminal apparatus which is adapted for use in eating and drinking establishments. The terminal includes a terminal housing having a generally rectangular shape and of size slightly larger in length and width to corresponding dimensions of a restaurant quest check. A folio-type cover is mounted to a left side portion of the terminal housing by a hinge arrangement and thereby is adapted to swing between open and closed cover positions. The cover corresponding in length and width to the terminal housing so as to completely cover a top face of the terminal housing in the closed cover position and to lie flat against a surface in the open cover position. A data entry keypad and an alphanumeric display are carried on the top face of the terminal housing. A card reader module is mounted in the terminal housing for accepting and reading a transaction data card selected for use by a guest of the establishment for payment of the amount of the guest check. A microcomputer system is carried within the terminal housing and being pre-programmed with operating system and application software for management of data entry, message display, card reading and transaction message formatting and storing functions associated with a preselected data entry sequence and data message format. The microcomputer system includes a data communication means for communicating a transaction data message to an external transaction terminal system for completion of transaction processing steps.

Preferably, the portable transaction terminal of this invention utilizes an alphanumeric display with at least two display lines, and the data entry keypad includes at least a pair of function keys associated with at least one line of the two line display designated as a function key message display. In this preferred embodiment, the application software is designed to implement a sequence of message display and data entry steps comprising:

a. display of a message prompting a wait person to enter a guest check total,
b. acceptance and storage of data entry on the keypad as a transaction total,
c. display of a message prompting a guest to perform a card read action using the card reader module,
d. display of a message prompting a guest to enter a tip including display of a pair of function key messages to prompt for use of the function keys for selecting tip entry in the form of a % of the guest check total or a specific tip amount,
e. responding to the actuation of one of the function keys by the guest by processing an associated sequence of steps of tip data entry, tip amount display and associated calculation steps to produce a transaction total amount and a display thereof to the guest.

The portable transaction terminal in accordance with this aspect of the invention has the advantage of providing for complete data entry at the guest table with a terminal that is especially suited by look and feel to the environment of a eating and drinking establishment. The terminal has the facility for entering all information needed to complete the transaction, including the server's gratuity. This eliminates multiple data entry sequences at the transaction terminal that are required when the server has to go back to the terminal to enter the amount of the tip and total the transaction. Possible data entry errors and the cost of correction of such errors is eliminated.

Another aspect of this invention features a portable transaction terminal apparatus specially adapted for use in eating and drinking establishments with a terminal housing having a generally rectangular shape and of size and weight adapted to be carried in a server's apron pocket. A data entry keypad is carried on a top face of the terminal housing and comprises a moisture impervious sealed keypad adhesively mounted on the top face and connected to a keysignal cable extending through an aperture in the top face underneath the sealed keypad. An alphanumeric display module is mounted on a electronic circuit board carried within the terminal housing with a display region of the display module communicating through an aperture in the top face of the terminal housing. This aperture is sealed on the top face of the terminal housing by a moisture impervious transparent cover member adhesively secured to the top face of the terminal housing. A card reader module is mounted in the terminal housing for accepting and reading a transaction data card selected for use by a guest of the establishment for payment of the amount of the guest check, the card reader module being mounted to the terminal housing and having a card entry slot defined by at the proximal end of a card guide bottom member which slopes inwardly and downwardly away from the top face of the terminal housing. This card guide bottom member has a distal end extending through an aperture in the electronic circuit board carried within the terminal housing and communicating with an aperture in a bottom face of the terminal housing to channel any spilled liquids entering the card guide all the way through the interior of the terminal housing to exit through the aperture in the bottom face thereof. A microcomputer system is carried within the terminal housing on the electronic circuit board and being pre-programmed with operating system and application software for management of data entry, message display, card reading and transaction message formatting and storing functions associated with a preselected data entry sequence and data message format, and including a data communication means for communicating a transaction data message to an external transaction terminal system for completion of transaction processing steps.

A terminal having the features of this aspect of the invention has the advantage of being virtually spillproof.

Another aspect-of this invention features a transaction terminal apparatus comprising a terminal housing with a data entry keypad and an alphanumeric display mounted to the terminal housing. A drop-in type magnetic stripe card reader module mounted within the terminal housing and including a card accepting slot defined in an outside wall region of the terminal housing. A microcomputer system is carried within the terminal housing on the electronic circuit board and is pre-programmed with operating system and application software for management of data entry, message display, and card reading functions. The card reader module comprises a card guide bottom member and a card guide top member mounted together to define the entire bottom wall of a card guide and at least a major portion of a top wall thereof, a magnetic read head for reading at least one data stripe on a magnetic stripe card, and a head mounting member for carrying the magnetic read head and adapted for mounting to a bottom wall of the card guide in a registered position thereon. The bottom wall of the card guide having a length greater than the length of a magnetic stripe card to be inserted therein and having a front facing slot defined therein for receiving the fingers of a hand inserting a magnetic stripe card and thereby enabling full insertion of the card. This bottom member has an aperture therein adjacent the slot for receiving a front portion of a magnetic read head and enabling a data pick up element on the face thereof to contact a magnetic stripe on a card inserted in the card guide. The head mounting member having an aperture therein for receiving the magnetic pick up head, a cantilevered head support and spring bias element being integrally formed on a back portion of the head mounting member and extending behind the aperture for supporting the magnetic head therein and biasing the head toward a top surface of the card guide when the head mounting member is mounted to the card guide and the front portion of the magnetic read head is received in the aperture of the card guide. The bottom member and the head mounting member having cooperating position registration elements for accurately mounting the head mounting member relative to a side wall of the card guide so that the magnetic read head carried thereon will be aligned with a data stripe on a magnetic stripe card inserted in the card slot.

BRIEF DISCUSSION OF DRAWING FIGURES

FIG. 1 is a drawing showing the components of a transaction terminal system in accordance with this invention.

FIG. 2 is an isometric view of a portable transaction terminal in accordance with this invention.

FIG. 3 is another isometric view showing the bottom side and other sides of a portable transaction terminal in accordance with this invention.

FIG. 4 is an exploded assembly view of the main components of a portable transaction terminal in accordance with this invention.

FIG. 5 is an exploded assembly view showing an alternative embodiment of a portable transaction terminal in accordance with this invention.

FIG. 6 is a partial exploded assembly view showing the assembly of the card reader on a portable transaction terminal in accordance with this invention.

FIG. 7 is an exploded assembly view of a preferred version of a card reader for use in a transaction terminal in accordance with this invention.

FIG. 8 is top isometric view of a preferred version of a card reader for use in a transaction terminal in accordance with this invention.

FIG. 9 is a bottom isometric view of a preferred version of a card reader for use in a transaction terminal in accordance with this invention.

FIG. 10 is a view of tongue elements of a read head frame mounting arrangement.

FIG. 11 is a side view depicting a preferred form of read head mounting frame useful in a preferred version of a card reader for use in a transaction terminal in accordance with this invention.

FIG. 12 is an exploded assembly view of a docking station for a portable transaction terminal in accordance with this invention.

FIG. 13 is an exploded assembly view of components of a single unit recharger station for a portable transaction terminal in accordance with this invention.

FIG. 14 is an enlarged view of components shown in FIG. 13.

FIG. 15 is an exploded assembly view of a multiunit recharger station for portable transaction terminals in accordance with this invention.

FIGS. 17A through 17F are circuit schematic diagrams of a preferred arrangement of electronic circuit components of a portable transaction terminal in accordance with this invention.

FIG. 18 is a circuit diagram of a preferred arrangement of electronic circuit components of a docking station useful in conjunction with a portable transaction terminal in accordance with this invention.

FIG. 19 is a circuit diagram of a preferred arrangement of electronic circuit components of a recharger control module useful in conjunction with a portable transaction terminal in accordance with this invention.

FIG. 20 is circuit diagram of a power supply module useful in a multiunit recharger unit in accordance with this invention.

DETAILED DESCRIPTION OF INVENTION EMBODIMENTS

Figure 21:
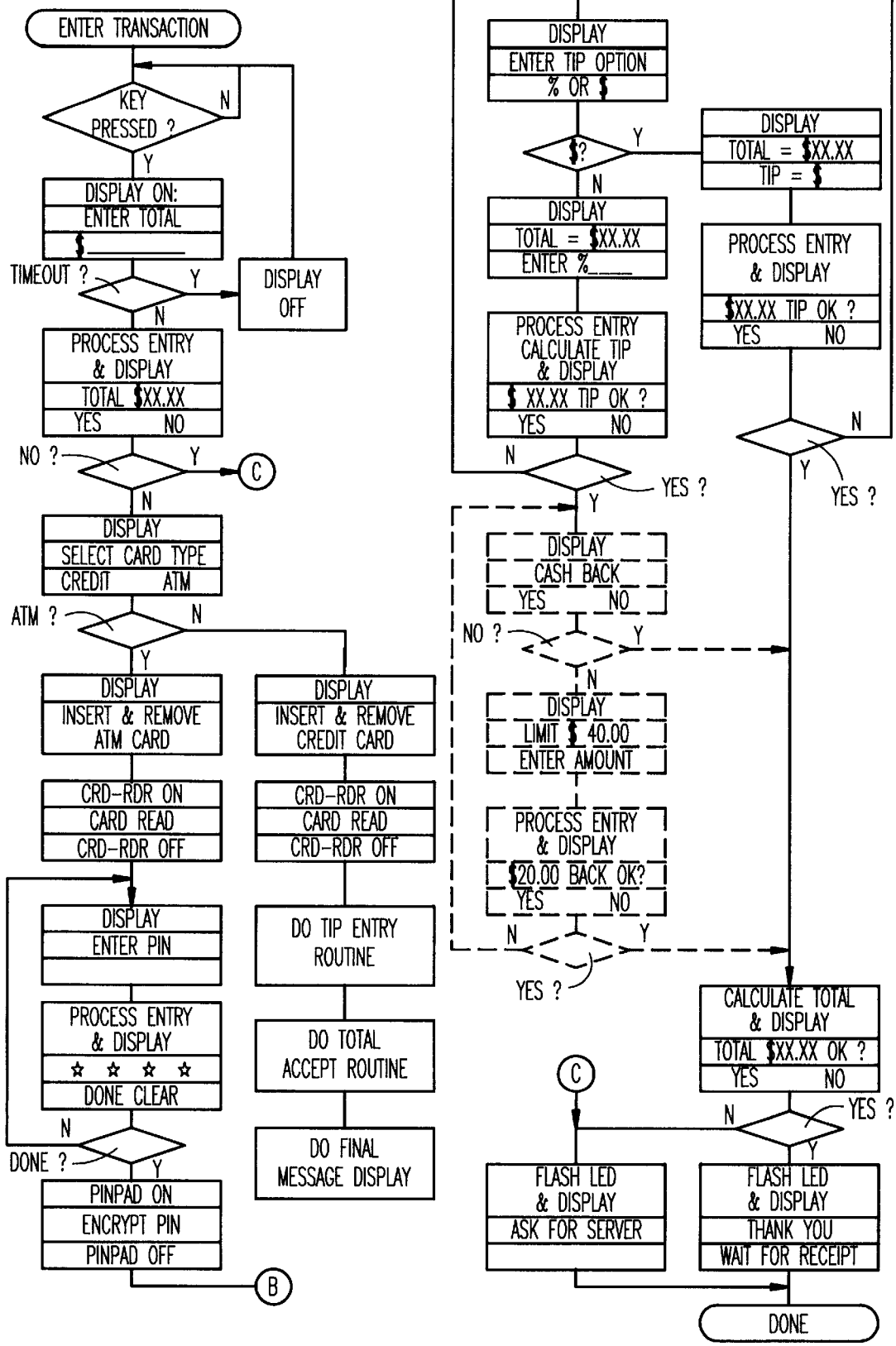
FIG. 21 is a software flow chart illustrating a sequence of operation steps for transaction data entry on a portable transaction terminal in accordance with this invention.

Portable transaction terminal 10: Structure & Use (FIGS. 1, 2, 21)

FIG. 1 shows a portable terminal 10 in accordance with this invention inserted into a docking station 20 for communicating transaction data entered at the guest table to transaction terminal so that the on line debit or credit approval process can be carried out. As will be discussed more fully below, this invention provides for complete transaction data entry at the quest table with the guest doing most of the data entry steps guided by message displays. With data entry completed, the quest retains the transaction card, and the server brings the portable terminal 10 to the point-of-sale transaction terminal location to complete the transaction.

Portable transaction terminal 10, as shown in FIGS. 2 and 3, comprises a terminal housing 111 with a folio-type cover 112 mounted to a left side portion of the terminal housing 111 by a hinge arrangement 120. Cover 112 swings between an open cover position and closed cover position. Cover 112 corresponds in length and width to terminal housing 111 so as to completely cover the top face of the terminal housing in the closed cover position and to lie flat against a surface in the open cover position. Pockets 113 and 114 are provided in the underside of cover 112 to hold a guest check and other paper items. In the open cover position a guest check inserted in the cover is visible while data entry on keypad 115 is carried out.

Keypad 115 includes a data entry key section 116, a screen addressable function key section 117 and a fixed function key section 118. Display 118A is a two line alphanumeric display. Card reader 119 is a magnetic stripe card reader, but it should be apparent that the portable transaction terminal of this invention could just as easily incorporate a reader for a smart card (IC card).

Portable transaction terminal 10 includes a battery compartment 121 housing rechargeable batteries for powering operation of the terminal.

Figure 16:
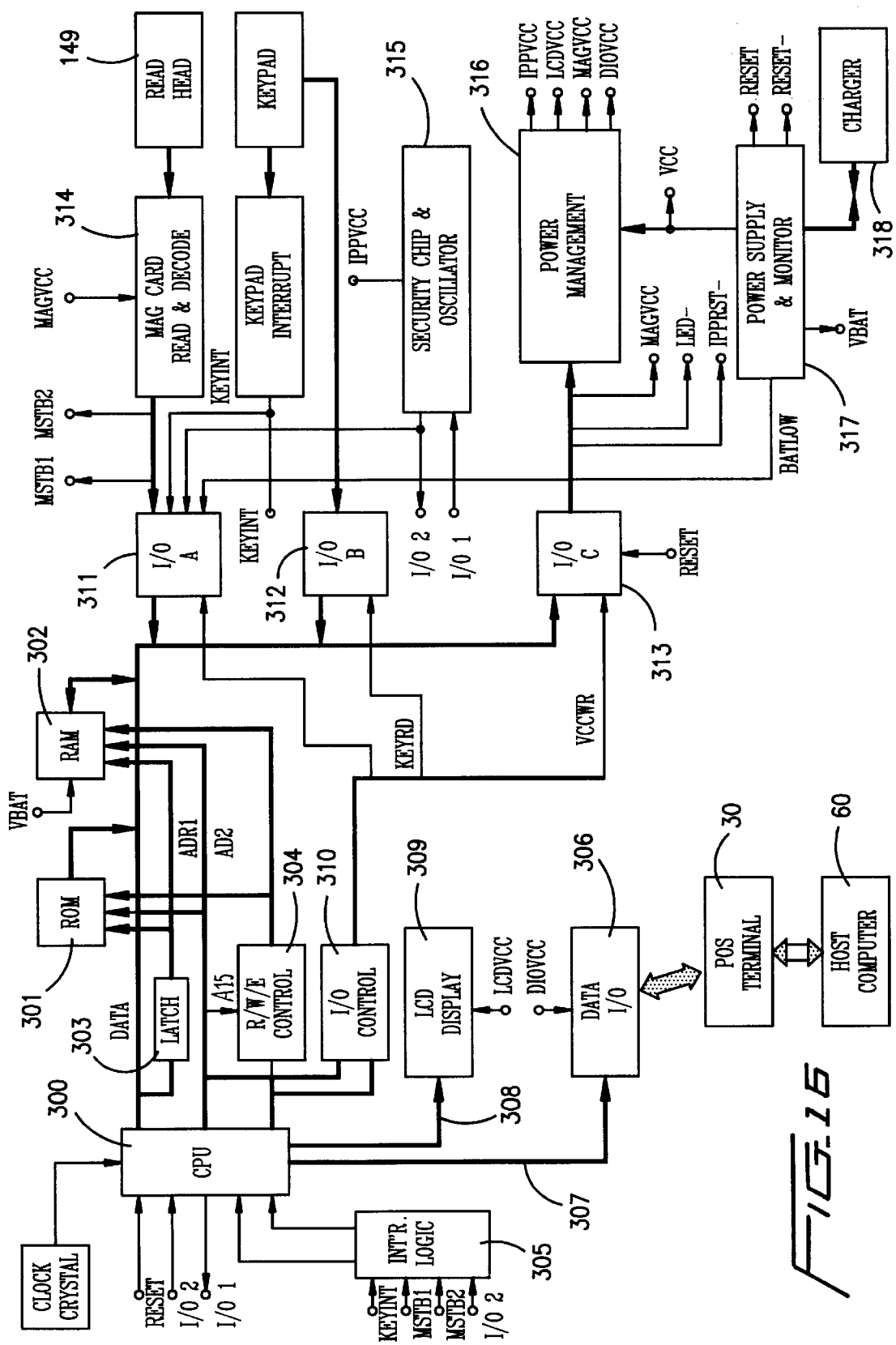
FIG. 16 is a block schematic diagram of electronic circuit components of a portable transaction terminal in accordance with this invention.

A microcomputer system (shown in block diagram form in FIG. 16, is carried within the terminal housing and is pre-programmed with operating system and application software for management of data entry, message display, card reading and transaction message formatting and storing functions. This microcomputer system includes a data communication facility for communicating a transaction data message to transaction terminal 30. In this embodiment, an infrared (IR) serial data port is provide in terminal housing 111 and communicates with a corresponding IR port in docking station 20 through a window 122 carried on the back side wall of terminal housing 111 as shown in FIG. 3. A viligle light signaling device in the form of a visible light emitting diode is also provided in terminal housing 111 behind window 122 and function as a server calling signal when transaction data entry by the guest has been completed. This back side wall of terminal housing 111 also carries a set of battery charging contacts 123.

Portable transaction terminal 10 is specially designed for the environment of an eating and drinking establishment with moisture impervious sealed keypad 115 and sealed display 118A. Card reader module 119 is designed as a "channel through" or "flow through" module in which liquid inadvertently spilled on portable transaction terminal 10 and entering the card reader is channeled all the way through terminal housing 111 and exits through an aperture 124 on the back face. This prevents such liquid spillage from contacting and contaminating the electronic circuit board carried within terminal housing 111 and causing a malfunction of the terminal.

As one example of an application program loaded into portable transaction terminal 10, FIG. 21 illustrates an operation sequence of portable transaction terminal 10 generally as follows. The server carries the unit to the guest's table along with the guest check showing the amount of the guest charge without gratuity. If the guest wishes to pay by credit card or debit card, the server presses any of the keys on keypad 115 and the terminal wakes up and turns the display on with the message:

---
ENTER TOTAL
$ _____
---

The server enters the guest charge amount and hands the terminal to the guest. [If the server does not respond within a preset timeout period, the terminal turns off the display and goes back to sleep. Similar time-out checks may be performed at other steps in the overall process to manage power usage by the terminal.]

The terminal next displays the message:

---
TOTAL $132.55
YES    NO
---

Assuming the server entered the correct total, the guest presses the function key associated with the YES on the display. The terminal performs a checking step to determine which function key was pressed and takes the next appropriate action. In this case, the terminal next displays the message:

---
SELECT CARD TYPE
CREDIT    ATM
---

If the NO function key were pressed, the terminal would skip to point C on the chart of FIG. 21 and flash the LED and suggest that the guest ask for the server. The flow chart of FIG. 21 is easily followed with steps of this description and will not be further discussed herein.

Assuming the guest wishes to pay with an ATM card (a debit card transaction), the guest presses the function key associated with that label on the display, and the terminal next wakes up the card reader electronics (applies power to that portion of the system associated with reading the card) and displays the message:

---
INSERT AND REMOVE
ATM CARD
---

The guest inserts an ATM card into the card reader and then removes it. [A "bad" card read would be handled by appropriate remedial message displays and actions asking the guest to repeat the operation and allowing a certain number of tries before giving up and going to point C in the diagram of FIG. 21.] Card reader 119 reads and stores the data on the card and then the terminal turns off the card reader electronics section and displays the message:

---
ENTER PIN
---

As the guest initiates PIN entry, the display switches to the message:

---
****
DONE    CLEAR
--- showing a "*" for each PIN digit entered as feedback.

When the guest presses the DONE function key, the terminal 10 wakes up the internal PIN-Pad module to encrypt the PIN and return it to the microcomputer system for storage.

The terminal then displays the message:

---
ENTER TIP OPTION
% or $ _____
---

If the guest presses the % function key, the terminal displays the message:

---
TOTAL = $132.55
ENTER % _____
---

The guest enters a percentage tip on the keypad. Assuming 20 is entered the terminal calculates the dollar amount of the tip and displays the message:

---
$ 26.50 TIP OK?
YES    NO
---

Assuming the guest presses the YES function key and also assuming that the terminal is programmed or configured to allow for cash back in a debit transaction, the terminal then displays the message:

CASH BACK?
YES    NO

Assuming the guest needs some cash to tip the valet parking attendant, the guest presses the function key now labeled YES and the terminal next displays the message:

LIMIT $40.00
ENTER AMOUNT

After the guest enters the amount desired, assume $20.00 the terminal next displays the message:

$20.00 BACK OK?
YES    NO

If the guest accepts the cash-back amount, he/she presses the function key labeled YES, and the terminal calculates the total of the transaction as the sum of the guest total, tip amount, and cash back amount and displays the message:

TOTAL $179.05 OK?
YES    NO

If the guest accepts the total and presses the function key labeled YES, the terminal wakes up the data communication port begins flashing the LED signal to alert the server and displays the message:

THANK YOU.
WAIT FOR RECEIPT

The server then recovers the terminal, takes it to the transaction terminal location, and inserts the portable terminal 10 into docking station 20 shown in FIG. 1, to upload the transaction data and complete the debit transaction by telephoning the appropriate host computer, receiving approval of the amount of the transaction, and printing a debit receipt for the customer. The details of the transaction data upload will be described later.

If a credit card were used by the guest, the terminal would perform a subset of the same display and data entry steps, namely tip entry and total accept routines since PIN entry and cash back options would not be relevant to that type of transaction.

Portable transaction terminal 10 is designed so that the owner of the establishment can customize the terminal operation with configuration selections. Full application programmability is also provided within the limits of the hardware environment and certain other constraints.

Portable transaction terminal 10—Mechanical Assemblies (FIGS. 4–10)

FIGS. 4–10 illustrate the details of the various mechanical subassemblies and parts of one embodiment of a portable transaction terminal in accordance with this invention. Terminal housing 11 shown in FIGS. 2 and 3 is comprised of an upper housing member 130 and a lower housing member 131. Other elements and subassemblies are cover member 112, electronic circuit board 137 which carries all the electronic circuit components of the terminal, display module 138, keypad elements 132,133, card reader module 119, and rechargeable battery 141.

Upper housing member 130 carries keypad elements 132 and 133 of a standard type of sealed membrane keypad which is adhesively secured in a recessed area on a front face thereof and communicates signals via a flexible cable 134 extending through an aperture 135 as shown in FIG. 6. Cable 134 has a connector 136 which mates with a connector on circuit board 137 which is mounted to lower housing member 131 on standoffs 182. This provides a moisture impervious sealed keypad for the portable transaction terminal.

LCD display module 138 comprises an off-the-shelf two line display module. The display module is a 2 line by 16 character dot matrix LCD module. The LCD module contains its own microcontroller for handling character generation and display refresh. This display module 138 is mounted to circuit board 137 on standoffs 139 to position the top face of the display within display aperture 140 in upper housing member 130. A transparent display cover 141 is mounted over the display aperture to seal the aperture against moisture incursion into the interior of the terminal housing 111.

Lower housing member 131 defines, in cooperation with an associated section of electronic circuit board 137, an internal battery compartment 181 for rechargeable battery pack 141. A removable battery compartment cover 180 slides over the opening in the battery compartment 181 in lower housing member 131. FIG. 4 shows a jack type connector 142 for connecting recharging current into the terminal. The alternative three prong terminal arrangement 142A shown in FIG. 5 is preferred and is the one utilized in the circuit diagrams in other drawing figures described below.

Optical communication elements 143 are mounted on electronic circuit board 137 and communicate output signals through a transparent window 144 received in appropriately notched portions of the sidewalls of the upper and lower housing members.

FIG. 4 illustrates elements of one embodiment of a card reader module 119 and FIGS. 5 and 7–11 illustrate a preferred embodiment of the card reader module 119. Card reader module 119 comprises a bottom member 145 and a top member 146 which snap together using a resilient hook and catch arrangement as shown. Wall portions 147,148 formed on upper housing member 130 provide portions of the upper card guide walls, the remainder being provided by top member 146. Bottom member 145 forms the entire bottom wall of the card guide and the side walls. The bottom wall is notched to reduce card insert friction. Magnetic read head 149 is carried in a frame portion of a cantilevered mounting arm 150 which is mounted to the underside of bottom member 145. A preferred form of read head frame and integral bias spring and mounting arrangement are shown in FIGS. 7–10.

Read head 149 is carried in an aperture 152 in mounting frame 151. A cantilevered read head support and bias spring member 153 is formed integrally on mounting frame 151 and is best seen in FIG. 11. A projection 154 provides for gimbaled movement of the read head in the frame to adapt to card warp and other conditions and keep the read head face in contact with the magnetic data stripe on a magnetic stripe card.

A hook and tongue member 160 formed on bottom member 145 on one side of read head admitting aperture 162 and a tongue member 161 formed on the other side of the aperture cooperate with groove elements 165, 166 on the ends of mounting frame 151 to provide two separate selectable and accurately registered mounting positions for frame 151 which is then fastened to bottom member 145 with a fastener 167. Read head 149 has two data pick up elements on its front face and this mounting arrangement provides accurate positioning of the read head for alternatively reading track 1 and 2 or track 2 and 3 of the data tracks on a magnetic stripe card passing through the card reader slot.

Bottom member 145 mounts to electronic circuit board 137 by way of an arrangement of hooks 170 that are received in corresponding slits 171 in electronic circuit board 137. As shown in FIG. 4, the underside of upper housing member 130 has an arrangement of resilient hooks 175 which cooperate with catch elements 176 formed on the wall of bottom member 145 of card reader 119 to mount the card reader module to the upper housing member.

Bottom member 145 of card reader module 119 provides a sloping card guide orientation, i.e. a card guide that slopes downwardly and inwardly within terminal housing 111. The large notched region in card reader module 119 and terminal housing 111 accommodates the fingers of a person pushing a card into the card reader. The slope of the card slot makes it easy for persons to insert the card into the card reader slot when the terminal housing is lying on a table top, even if the person has large hands and fingers.

Referring to FIGS. 4 and 5, it should be noted that an aperture 190 is formed in electronic circuit board 137 and this aperture accommodates the projecting distal end portion 192 of card reader. This end portion 192 is received in the aperture 191 formed in lower housing member 131. The apertures 193 in this end portion 192 allow any liquid entering the card guide to pass through the card guide and out the bottom of the terminal housing. The sloping card guide bottom surface assists in channeling any liquid spilled into the card slot down through the card guide and out the bottom apertures.

This self-draining feature of the card reader module of a portable transaction terminal of this invention along with the other sealed and moisture impervious assemblies makes the terminal especially suitable for use in eating and drinking establishments where occasional inadvertant spills of liquid onto the terminal housing can be expected. The overall design of the portable transaction terminal of this invention makes it unlikely that any such liquid spills will reach the sensitive electronic circuitry on the electronic circuit board within the terminal housing and cause a malfunction of the unit.

Docking Station 20: (FIGS. 12, 18)

As shown in FIG. 12, docking station 20 comprises a main housing member 200 with a back member 201 which snap-mounts on the back edge walls thereof, and a front cover member 202 which snaps onto lower front edge walls thereof after insertion of electronic circuit board 203 and optical window 204. This assembly then mounts in the aperture 205 on base member 206. Main housing member 200 and front cover member 202 cooperate to form an accurately shaped receptacle for insertion of the portable transaction terminal of this invention. The cross sectional shape of this receptacle matches closely that of the portable transaction terminal with the cover member 112 in a closed cover position. Portable transaction terminal 10 can thus only be inserted with top side down into this docking station receptacle in one orientation. The top side down insertion is required since the top side wall of portable transaction terminal 10 carries the optical data transmission window.

Electronic circuit board 203 carries an assemblage of optical transmitter and receiver components 210 which are in communication with optical window 204 in a bottom wall of the receptacle. When portable transaction terminal 10 is inserted into the receptacle, the optical window 122 thereon lies adjacent to the optical window 204 and the surrounding walls of the receptacle block out ambient light and preclude such light interfering with operation of these optical data communication elements. A female telephone receptacle 211 is adapted to receive a male phone jack connection from a transaction terminal with the four wires of this connection providing DC power and transmit and receive data lines to the circuitry on electronic circuit board 203 as shown in FIG. 18. The IC chip on electronic circuit board 203 provides two way conversion of optical data signals and electrical data signals to interface portable transaction terminal 10 to transaction terminal 30 as shown in FIG. 1.

Recharger Unit—Single: (FIGS. 13, 14, 19)

FIGS. 13 and 14 illustrate the adaptation of the docking station components shown in FIG. 12 to provide a single unit recharger 215 for portable transaction terminal 10. A three compartment receptacle 221 mounted to bottom wall 220 receives three spring loaded charger contact pins. These are positioned to contact the three charger contacts 123 on the back side of portable transaction terminal 10 (seen best in FIG. 3) when portable transaction terminal 10 is inserted into the receptacle formed by the housing of this single unit recharger.

Electronic circuit board carries recharge control circuit elements shown in the schematic of FIG. 19. Connectors 223 and 224 and associated wiring (not shown) connect the charger controller circuitry to the charger contact pins. Power jack 225 is used with an external DC power supply unit to provide power to electronic circuit board 222 and circuitry thereon. Dual color LED 226 provides charge status and battery condition diagnostic information and communicates through an aperture (not shown) in the front housing member (202 in FIG. 12).

FIG. 19 shows the recharge controller circuitry carried on electronic circuit board 222. The recharge controller utilizes an ICS-1702 Charge Controller IC available as a standard item from Integrated Circuit Systems, Inc., Valley Forge, Pa. The data and product application sheets on this IC product which describe the general theory of operation and details of the function of the recharge controller circuitry are available from the vendor and are hereby incorporated by specific reference.

The ICS-1702 IC can be programmed for a variety of charge and discharge conditions. The portable transaction terminal system of this invention uses a charge rate of C/4, a fast charge mode, and a charge termination mode involving Voltage Slope Termination and Fast Charge Timer Termination.

When portable transaction terminal 10 is inserted into the charger 215, relay 230 (FIG. 17D) inside the terminal housing is energized to disconnect the Ni-Cad battery pack from the circuitry on electronic circuit board 137 and connect it to the contacts 123 on the terminal housing. The recharge controller detects the presence of a ni-cad battery by periodically sending out a pulse of energy on line 231 to the plus side of the Ni-Cad battery in the portable transaction terminal and then monitoring the voltage response of the line after the pulse is removed. When a valid battery pack is detected, the controller energizes red LED 226A to indicate the recharger is functioning to charge the battery pack. If a faulty connection or faulty batteries are sensed, the red LED will not be energized to indicate a problem with recharging.

Assuming a valid battery and proper connection are determined, the controller begins a conditioning period of a few minutes while the charge state of the battery pack 141 in portable transaction terminal 10 is determined. If battery pack 141 is fully charged already charge cycle will be terminated and green LED 228B will be illuminated by operation of the logic circuitry feeding signals to the dual color LED 226B.

If battery pack 141 is not fully charged, the controller will begin a fast charge cycle. (The term "fast" here is relative to a C/10 or C/15 trickle charge.) During the fast charge period, the controller will periodically perform a brief discharge to condition the Ni-Cads internally. This discharge rate is about 3% of the charge rate and greatly extends the capacity and life of the battery pack. Ni-Cad batteries exhibit a negative voltage slope when fully charged and the controller detects this and terminates the fast charge period.

A fast charge termination timer is also in effect during this fast charge mode and will turn off the recharging and prevent the batteries from being over charged if the negative voltage slope is missed. When the fast charge period has terminated, the green LED 226B is illuminated, and the controller goes into a maintenance mode which consists of a C/30 charge rate of unlimited duration. This replaces the power lost during a normal internal self discharge of Ni-Cad cells. The green LED remains lighted throughout this maintenance charge period indicating a fully charged battery in the portable transaction terminal 10.

Recharger Unit—Multi: (FIGS. 15, 19, 20)

Recharger unit 250 shown in FIG. 15 is capable of simultaneously recharging four portable transaction terminals 10 of this invention. Housing 251 has four separate terminal receptacles 252 formed therein. Each of these receptacles has a set of three spring loaded contact pins mounted in holders 253 which mount in apertures 254 in bottom walls of the individual receptacles. Four individual recharge controller boards 222 are mounted underneath each receptacle. Connectors 223 and associated cables connect the recharge current and voltage signal to operate the relay in each portable transaction terminal to these contact pin arrangements.

A separate power supply board 255, circuitry of which is shown in FIG. 20 is mounted on base and connects via a daisy chain cable and connector arrangement to the individual recharge controller boards to provide power thereto. An external AC power supply connects to power receptacle 260. The individual recharge controller boards are not populated with power supply receptacles as is the one in the single unit recharger shown in FIGS. 13 and 14. Each of the recharge controller boards operates in the same fashion as described above and in the above-referenced data and application sheets.

Portable transaction terminal 10:

Electronics—Function Block Diagram FIG. 16

FIG. 16 illustrates the components of the microcomputer system which controls the operation of the portable transaction terminal 10 of this invention. Details of the circuitry and its operation will be given below in conjunction with the detailed circuit diagrams related to a preferred implementation of a microcomputer system system.

CPU 300 communicates via address and data busses with read only memory (ROM) 301, in which operating system software is stored, and with random access memory (RAM) 302 in which application software routines and input transaction data are stored. Address latch 303 enables the data bus to be used for both data and address functions. Read/write/enable control logic is provided to decode read and write and address signals from CPU 300 for operation of the two memory devices in a standard memory function control arrangement. Interrupts to CPU 300 are provided by direct I/O lines and by outputs of interrupt logic circuitry 305 which decodes other interrupt signals associated with card reader and keypress operation.

CPU 300 includes a serial I/O port 307 which controls serial data I/O 306 which is preferably, in the portable transaction terminal of this invention, an optical data I/O system of the infrared type. This data I/O communicates with a point-of-sale terminal, in this case through a docking station that converts IR data signals to electrical signals.

Another port 308 of CPU 300 interfaces to LCD display module 309. I/O control logic 310 controls the operation of I/O ports 311 to 313. I/O port 311 controls application of data signals from the magcard reader 314 and security module to CPU 300 as well as miscellaneous status and interrupt signals. I/O port 312 controls input of keypress data to CPU 300. I/O port 313 controls output of control signals to power management module 316. Power supply and monitor module 317 takes battery voltage and provides operating power to the other modules of the system and interfaces with the charger circuitry 318 for battery recharging.

Portable transaction terminal 10: Electronics

Preferred Embodiment of Circuitry and Operation (FIGS. 17A–17F)

A preferred embodiment of actual microcomputer system circuitry and related functional components will now be described in connection with the circuit schematics of FIGS. 17A through 17F. All of this circuitry is carried on the single electronic circuit board 137 within terminal housing 111.

Figure 17A:
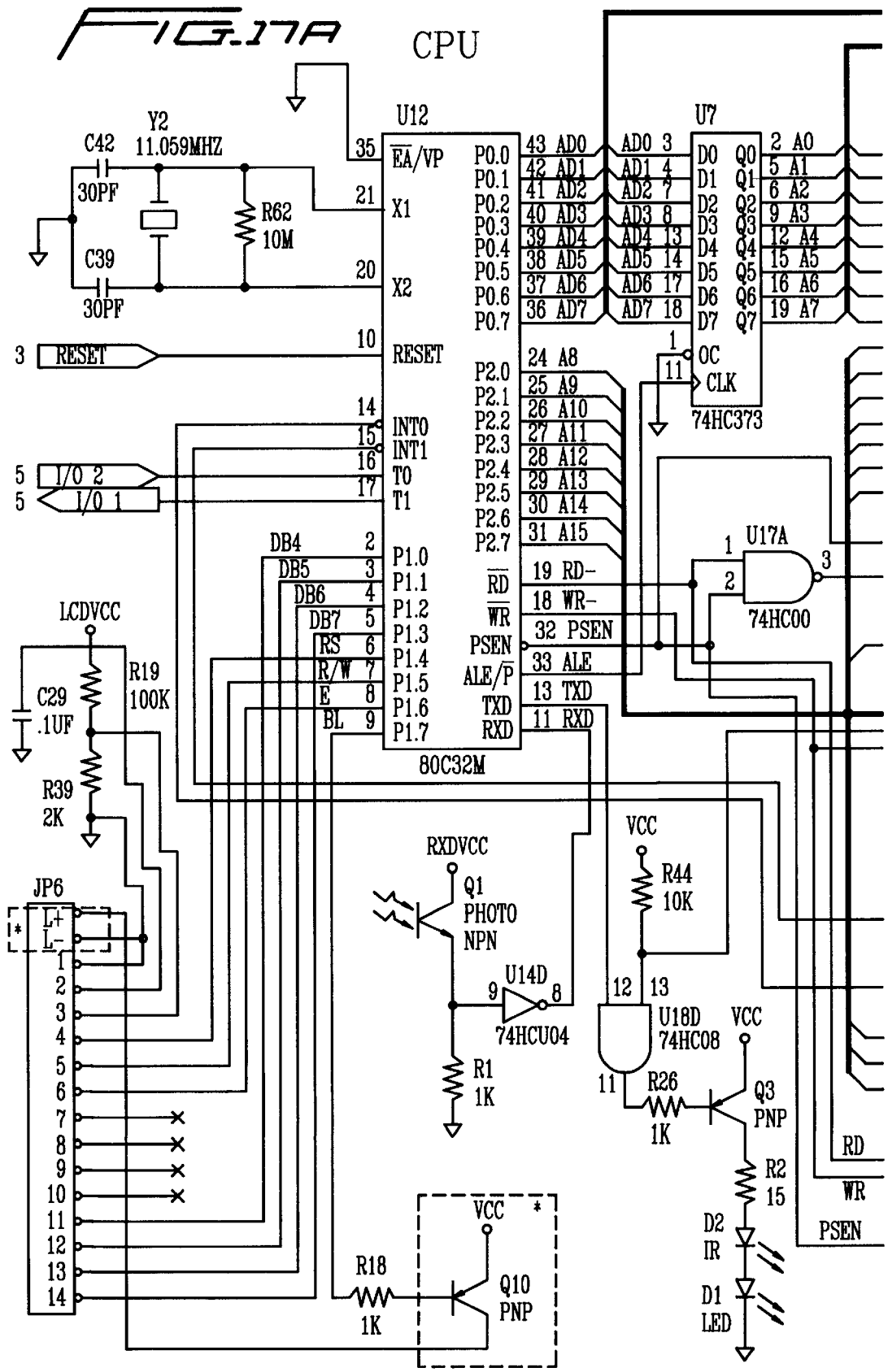

1. Microprocessor Section (FIG. 17A)

The main processor (U12) is an 80C32M manufactured by Philips Electronics. The Philips 80C32 is a high-performance microcontroller fabricated with high-density CMOS technology. The Philips CMOS technology combines the high speed and density characteristics of HMOS with the low power attributes of CMOS. Philips epitaxial substrate minimizes latch-up sensitivity.

a. Features:

The 80C32 contains no ROM, a 256×8 RAM, 32 I/O lines, three 16-bit counter/timers, a six-source two-priority level nested interrupt structure, a serial I/O port which is actually a full duplex UART, and on-chip oscillator and clock circuits. In addition, the 80C32 has two software selectable modes of power reduction: idle mode and power-down mode. The idle mode freezes the CPU while allowing the RAM, timers, serial port, and interrupt system to continue functioning. The power-down mode saves the RAM contents but freezes the oscillator, causing all other chip functions to be inoperative. In the portable transaction terminal of this invention the idle mode is used, but not the power-down mode.

b. Pin Descriptions:

VSS Ground: OV reference.

VCC Power Supply: This is the power supply voltage for normal and idle mode operation.

P0.0–0.7 Port 0: Port 0 is an open-drain, bi-directional I/O port. Port 0 pins that have 1s written to them float and can be used as high-impedance inputs. Port 0 is also the multiplexed low-order address and data bus during accesses to external program and data memory. In this application, it uses strong internal pull-ups when emitting 1s.

P1.0–1.7 Port 1: Port 1 is an 8-bit bi-directional I/O port with internal pull-ups. Port 1 pins that have 1s written to them are pulled high by the internal pull-ups and can be used as inputs. As inputs, port 1 pins that are externally pulled low will source current because of the internal pull-ups.

P2.0–2.7 Port 2: Port 2 is an 8-bit bi-directional I/O port with internal pull-ups. Port 2 pins that 1s written to them are pulled high by the internal pull-ups and can be used as inputs. As inputs, port 2 pins that are externally being pulled low will source current because of the internal pull-ups. Port 2 emits the high-order address byte during fetches from external memory and during accesses to external data memory that use 16-bit addresses. In this application, it uses strong internal pull-ups when emitting is. During accesses to external data memory that use 8-bit addresses, port 2 emits the contents of the P2 special function register.

P3.0–3.7 Port 3: Port 3 is an 8-bit bi-directional I/O port with internal pull-ups. Port 3 pins that have 1s written to them are pulled high by the internal pull-ups and can be used as inputs. As inputs, port 3 pins that are externally being pulled low will source current because of the pull-ups. Port 3 also serves the special features of the 8051 family, listed below:

RxD (P3.0) Serial input port.
TxD (P3.1) Serial output port.
INT0- (P3.2) External interrupt.
INT1- (P3.3) External interrupt.
T0 (P3.4) Timer 0 external input.
T1 (P3.5) Timer 1 external input.
WR- (P3.6) External data memory write strobe.
RD- (P3.7) External data memory read strobe.

RST Reset: A high on this pin for two machine cycles while the oscillator is running, resets the device. An internal diffused resistor to VSS permits a power-on reset using only an external capacitor to VCC.

ALE/PROG- Address Latch Enable/Program Pulse: Output pulse for latching the low byte of the address during an access to external memory. In normal operation, ALE is emitted at a constant rate of ⅙ the oscillator frequency, and can be used for external timing or clocking. Note: that one ALE pulse is skipped during each access to external data memory.

PSEN- Program Store Enable: The read strobe to external program memory. When the device is executing code from the external program memory, PSEN- is activated twice each machine cycle, except that two PSEN- activations are skipped during each access to external data memory.

EA-/VPP External Access Enable/Programming Supply Voltage: EA- must be externally held low to enable the device to fetch code from external program memory locations.

XTAL1 Crystal 1: Input to the inverting oscillator amplifier and input to the internal clock generator circuits.

XTAL2 Crystal 2: Output from the inverting oscillator amplifier.

c. Oscillator Characteristics:

XTAL1 and XTAL2 are the input and output, respectively, of an inverting amplifier. The pins are used in this invention as an on-chip oscillator and utilize input from a 11.0592 MHz crystal.

d. Reset:

A reset is accomplished by holding the RST pin high for at least two machine cycles (24 oscillator periods), while the oscillator is running. To insure a good power-up reset, the RST pin must be high long enough to allow the oscillator time to start up (normally a few milliseconds) plus two machine cycles. In this embodiment of the invention, reset is generated by the Maxim 709 Power-Supply Monitor with Reset (U15). The MAX709 provides a reset during power-up and power-down conditions. When VCC falls below the reset threshold (4.65V), RESET— goes low and stays low for 140 milliseconds after VCC rises above the threshold.

The 80C32 CPU 300 requires an active-high reset, so the RESET— output of the MAX709 goes through inverter U14C before becoming RESET for the 80C32. The RESET— output of the MAX709 is guaranteed to be in the correct state with VCC down to 1V. When VCC falls below 1V, the MAX709 RESET— output no longer sinks current — it becomes an open circuit. Therefore, high-impedance CMOS logic inputs connected to the RESET— output can drift to undetermined voltages. By adding a pull-down resistor (R24) to the RESET—pin, stray leakage currents will flow to ground, holding RESET— low.

f. Idle Mode:

In idle mode, the CPU 300 puts itself to sleep while all of the on-chip peripherals stay active. The instruction to invoke the idle mode is the last instruction executed in the normal operating mode before the idle mode is activated. The CPU contents, the on-chip RAM, and all of the special function registers remain intact during this mode. The idle mode can be terminated either by any enabled interrupt (at which time the process is picked up at the interrupt service routine and continued), or by a hardware reset which starts the processor in the same manner as a power-on reset. Idle mode consumes a maximum of 6 milliamps of battery power.

External Pin Status During Idle Mode
ALE High
PSEN- High
Port 0 Float
Port 1 Data
Port 2 Address
Port 3 Data In idle mode, Port 0 (the data bus) is floating. External pull-up resistors are necessary to keep the floating data bus from upsetting the CMOS inputs of other chips on the data bus. In idle mode, Port 1 (the display port) has the value of the last data byte output to that port before the idle command was invoked. If the display is to be turned off, then it is important that this port have all 0s in idle mode so that the display cannot draw power through the I/O pins.

2. Display Section

The display module 118A is a 2 line by 16 character dot matrix LCD module. The LCD module contains its own microcontroller for handling character generation and display refresh. The character generator handles 96 types of ASCII and Japanese characters, as well as 32 special symbols.

A. Display Commands:
Clear Display Clears entire display
Return Home Returns display being shifted to original position
Entry Mode Set Sets cursor move direction and specifies shift of display
Display ON/OFF Control Display on/off, Cursor on/off, Cursor blink/not
Cursor/Display Shift Moves cursor and shifts display
Function Set Data bus width ⅘ bits, Lines ½, Dots 5×10/5×7
Set CG RAM Address Sets character generator RAM address
Set DD RAM Address Sets display data RAM address
Read Busy Flag & Address Returns busy flag status & address counter value
Write Data to CG/DD RAM Writes data into DD RAM or CG RAM
Read Data from CG/DD RAM Reads data from DD RAM or CG RAM b. Display Interface:

The 80C32 CPU 300 interfaces to the LCD module through a 14-pin connector. The 4 data bits and 3 control lines are driven directly from Port 1 on the 80C32. The LCD module can operate in either 4-bit or 8-bit mode. In this design, we use 4-bit mode. The connector pin assignment is shown below:

| Pin # | LCD | Description | 80C32 |
|---|---|---|---|
| Pin 1 | VSS | Ground | |
| Pin 2 | VDD | +5 V | |
| Pin 3 | VL | Viewing Angle | * |
| Pin 4 | RS | Register Select | P1.4 |
| Pin 5 | R/W | Read/Write | P1.5 |
| Pin 6 | E | Enable | P1.6 |
| Pin 7–10 | D1–D3 | No Connect | |
| Pin 11–14 | D4–D7 | Data Bus | P1.0–P1.3 |

The Viewing Angle of the display is set by the resistor divider R23 and R24.

3. IR Communications Section (FIG. 17A)

a. IR Circuitry:

The 80C32 communicates with the outside world through an infrared optical link. This optical link consists of an IR phototransistor (for receiving signals) and an IR LED (for transmitting signals). The optical link is controlled by the serial port of the 80C32. The IR phototransistor (Q1) is activated by infrared light. If the infrared light is strong enough to turn the phototransistor on completely, then the input to U14D will be a '1'. This '1' is then inverted by U14B and the RxD input on the 80C32 will see a '0'. The phototransistor must be turned on enough to supply at least 3 mA of current through R1 in order to produce a '0' at RxD.

The IR LED (D2) is driven by the TxD output of the 80C32. When the TxD output is a '0', the PNP transistor (Q3) turns on, which in turn lights up the IR LED (D2). With Q3 turned on, there is approximately 64 mA of current flowing through R2, D2, and D1. R26 has a value of 1K, which means the base current for Q3 will about 4 mA. This means that only a DC current gain of 16 is needed from Q3, which is well below the specified minimum of 60 (for a 2N3906 with a collector current of 50 mA).

b. Serial Port:

The 80C32 serial port is full duplex, meaning it can transmit and receive simultaneously. It is also receive-buffered, meaning it can commence reception of a second byte before the previously received byte has been read from the register. (However, if the first byte still hasn't been read by the time reception of the second byte is complete, one of the bytes will be lost.) The serial port receive and transmit registers are both accessed at Special Function Register SBUF. Writing to SBUF loads the transmit register, and reading SBUF accesses a physically separate register. The serial port can operate in 4 different modes; however, in this invention Mode 1 is used.

In Mode 1, 10 bits are transmitted (through TxD) or received (through RxD); a start bit (0), 8 data bits (LSB first), and a stop bit (1). On receive, the stop bit goes into RB8 in Special Function Register SCON. The baud rate is variable in Mode 1.

c. LED Indicator:

The visible LED is in series with the IR LED, so it is active whenever the IR (TxD) is active. One of the purposes of the visible LED is to indicate when the IR is working. The other purpose of the visible LED is to indicate that the terminal is done with its current operation and is ready for the next step.

There are 2 modes for flashing the LED Indicator. The first mode is to transmit some "dummy" data. This will activate the visible LED, but has the disadvantage that the 80C32 must be in normal operating mode to transmit the data. The second mode is to set bit 5 of U8 (74HC374) to a '0'. This will force the output of AND gate U18D to a '0', which will turn on the visible LED. This mode has the advantage that the 80C32 can go into idle mode while the LED is active. By using this mode, the power consumption can be cut by a third during the LED activation time. The pull-up resistor R44 is necessary in order to keep the LED turned off when the outputs of U8 are floating (i.e.—during reset).

Figure 17B:
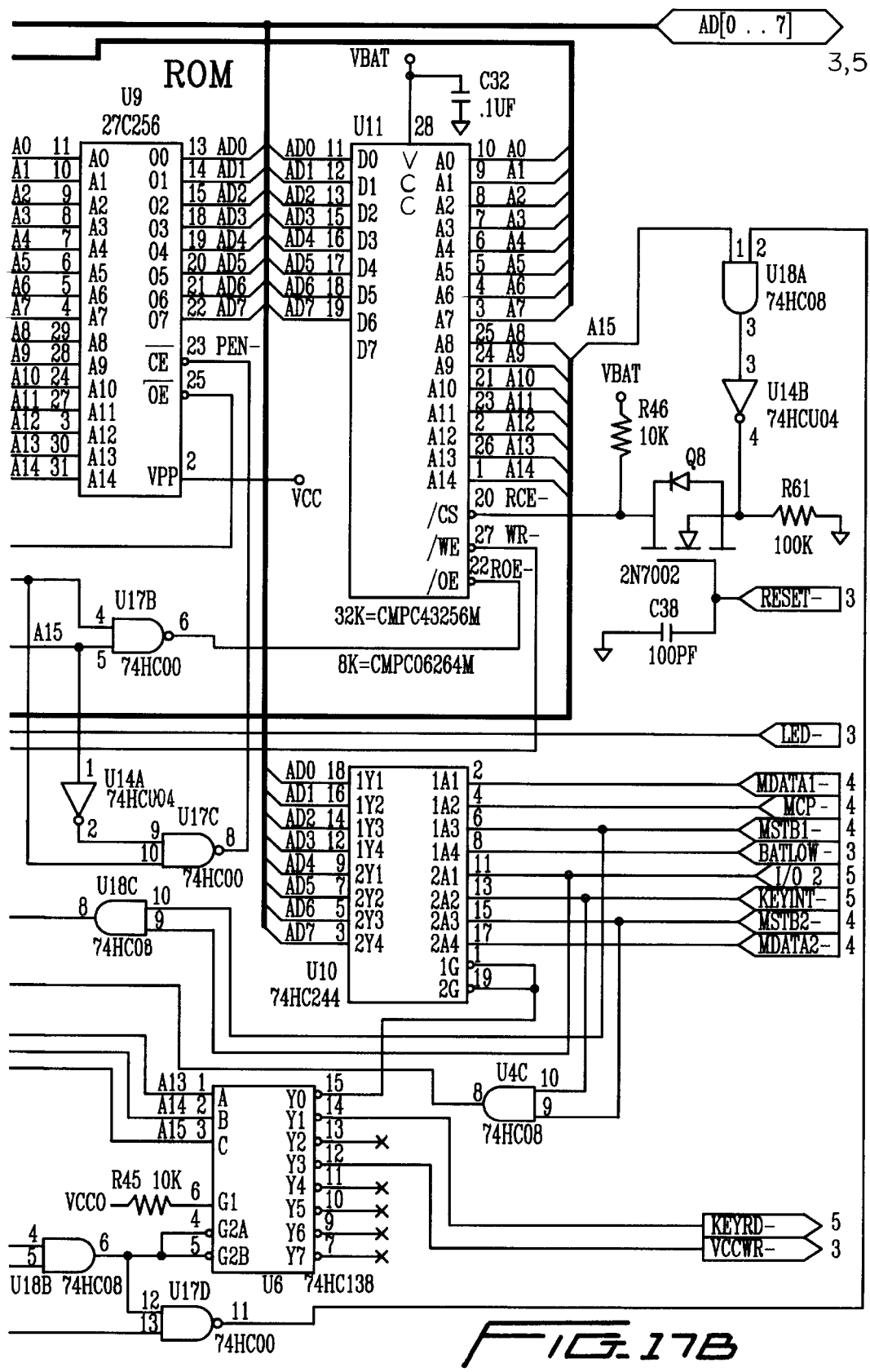

3. Memory Section (FIGS. 17A, 17B)

a. Configuration:

The standard memory configuration is 32K bytes of OTP ROM and 8K bytes of static RAM. The optional configuration is 32K bytes of OTP ROM and 32K bytes of static RAM. The 80C32 has separate code and data space. This means that the commands for accessing code are different than the commands for accessing data. The memory map is as follows: Code Space Data Space

| 0000-7FFF | OTP ROM | I/O Devices |
|---|---|---|
| 8000-FFFF | 32K RAM | 32K RAM |
| E000-FFFF | 8K RAM | 8K RAM |

Note that the RAM is mapped into both the code space and the data space. This allows the O.S. to load the Application into RAM and then to execute it as though it were in ROM.

b. Control Lines:

On the ROM chip (U9), the chip enable is called PEN- (for peripheral enable). PEN- is generated by the NAND gate U17C. The inputs to Ul7C are A15- and (RD or PSEN). A15- is generated by the inverter U14A. The other input to U17C (RD or PSEN) is generated by the NAND gate U17A. The conditions for enabling U9 are: A15 is low (meaning lower half of memory) and it is a code/data space read command. This is actually a mistake. It should only be enabled for a code space read command. By enabling it for data space read commands, we conflict with the I/O device reads. In other words, when the 80C32 is reading the keyboard, the ROM will also be enabled. We avoid that problem by using the output enable on the ROM chip. The output enable is connected to the PSEN- output on the 80C32. This ensures that the ROM outputs are only 'turned on' if it is a code space read.

On the RAM chip (U11), the chip select is called RCE- (for RAM chip enable). RCE- is generated by the NAND gate composed of U18A and U14B. The inputs to the NAND gate are A15 and (RD or WR or PSEN). A15 is taken directly off of the address bus. The input to the NAND gate (RD or WR or PSEN) is generated by the NAND gate U17D. One input to U17D is PSEN- (from the 80C32) and the other input is generated by U18B. The conditions for enabling U11 are: A15 is high (meaning upper half of memory) and it is a code/data space read or write command.

The function of Q8 is to disable the chip select during power-up and power-down. Whenever RESET- is active (meaning low), QB breaks the connection between the RCE-input on the RAM chip and the output of the NAND gate composed of U18A and U14B. The pull-up resistor R46 holds the chip select input high and disables the RAM chip. This preserves the RAM contents during power-up and power-down. The write enable input for U11 is connected to the WR- output on the 80C32. The output enable input for U11 is called ROE- (for RAM output enable). ROE- is generated by the NAND gate U17B. The inputs to U17B are A15 and (RD or PSEN). A15 is taken directly off of the address bus. The other input to U17B (RD or PSEN) is generated by the NAND gate U17A. The conditions for enabling the RAM outputs are: A15 is high (meaning upper half of memory) and it is a code/data space read command.

c. Battery Backup:

The RAM chip is powered at all times. When VCC is above 3V, the RAM chip is powered by the +5V rail. When VCC is below 3V, the RAM chip is powered by the Lithium Battery (BT1). The battery voltage and VCC are separated by diodes D3 and D4. These are special diodes in that they have a low forward voltage drop. The resistor R43 is in series with the battery to satisfy UL requirements. The RAM chip uses approximately 1 microamp of current when it runs off of the battery. This means that the battery will last for at least 5 to 10 years.

Figure 17C:
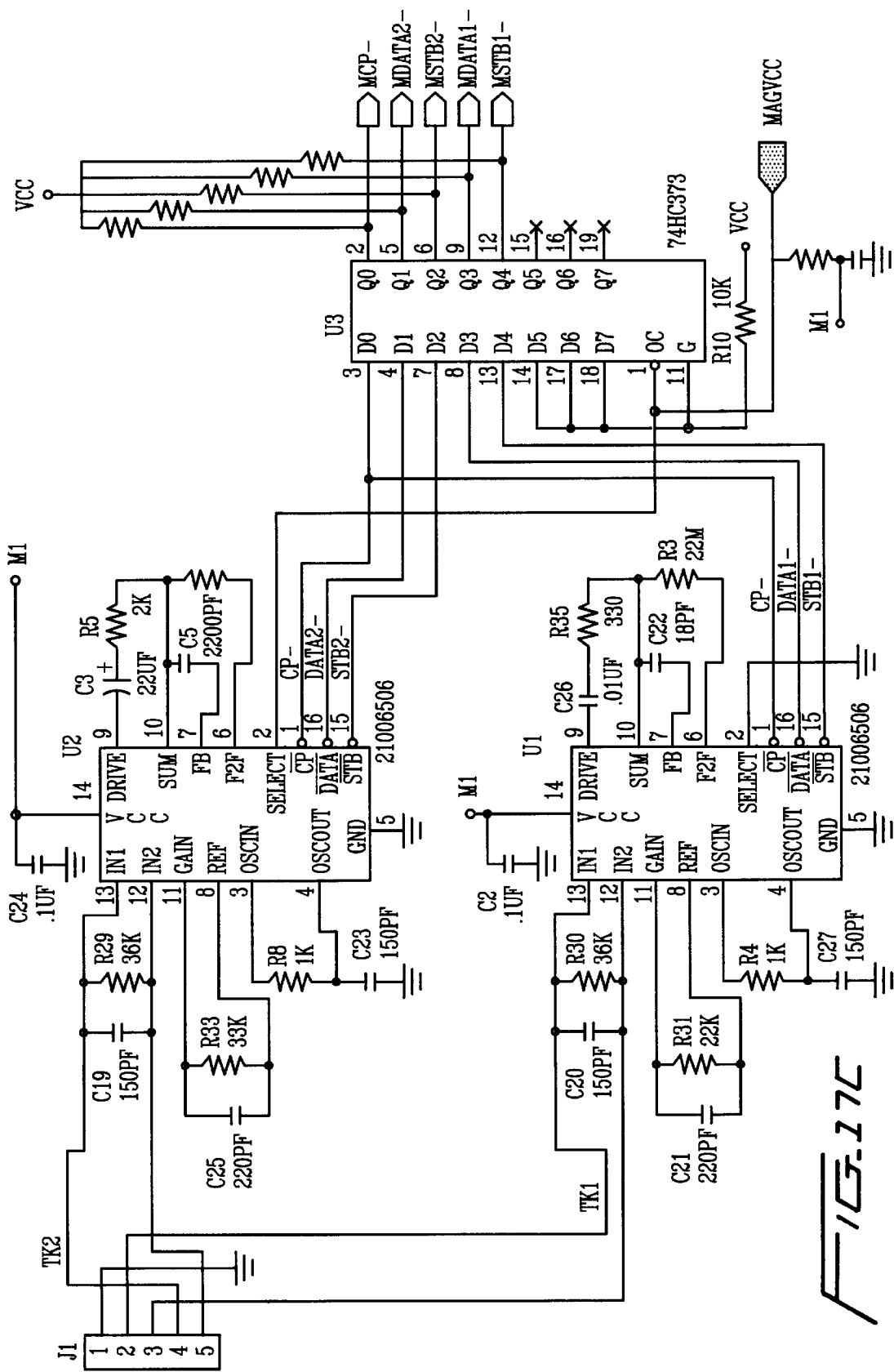
Figure 17D:
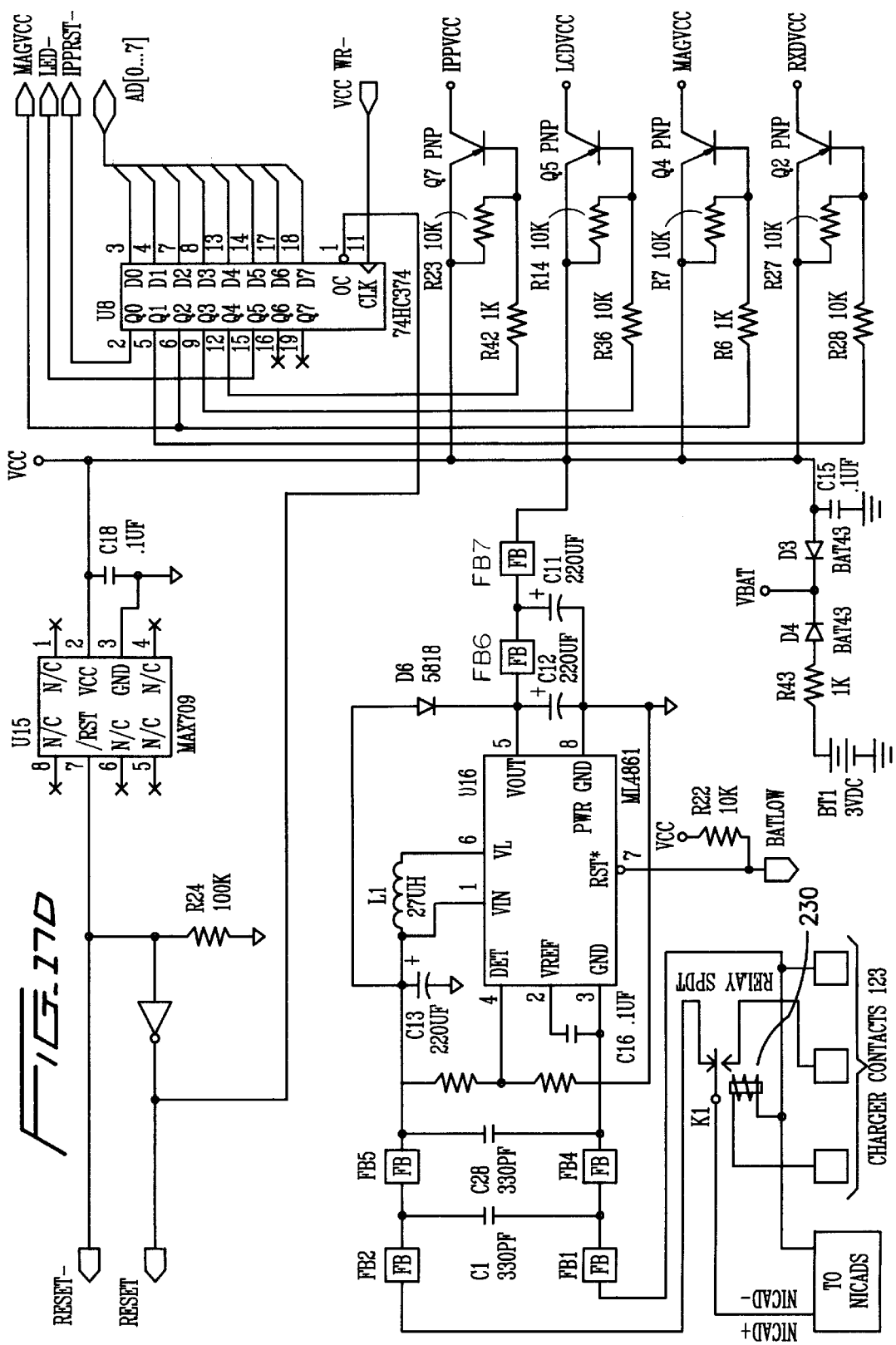

4. Power Management Section (FIG. 17D)

a. Overview:

Since the Folio is a battery-powered device, we want to keep the current drain as low as possible. In order to accomplish that goal, the main processor (U12) sleeps most of the time and only 'turns on' the peripherals as needed. For instance, in typical applications the Folio is asleep 90% of the time (waiting for a keystroke). In this state, the 80C32 is in idle mode (which consumes a maximum of 6 mA) and only the display is 'turned on'. The typical current drain in this state is 5 mA (for both the 80C32 and the LCD module). This translates to a current drain of 12.5 mA on the NiCad battery pack (because it is 2.5V instead of 5V and only 80% efficient).

The 80C32 controls power to the security chip, LCD module, mag card reader, and IR phototransistor.

b. Power Control Register:

The power control register is U8 (74HC374). By writing ones and zeros to this port, the 80C32 can turn power off/on to each of the peripherals. The CLK input for U8 is generated by U6 (74HC138). The output of U6 which connects to the CLK input of U8 is Y3. The Y3 output is active low. The conditions for enabling the Y3 output are (A13=1 and A14=1 and A15=0) and (RD or WR). In other words, it has to or write command within the address range of 6000 to 7FFF. The output control input for U8 is generated by U14C. This is the RESET signal, which is active high and disables the U8 outputs during power-up or power-down. This ensures that the peripherals are 'turned off' during the startup of the switching power supply.

c. Security Chip Power:

The power to the security chip (U13) is controlled by Q7. When output bit 4 of U8 goes low, the PNP transistor 'turns on'. The base resistor R42 is 1K, which means that the base current will be about 4 mA. This means that we will only need a DC current gain of 10 from Q7, which is well below the specified minimum of 60 (for a 2N3906 with a collector current of 50 mA). The pull-up resistor R23 is there to disable Q7 when the outputs of U8 are floating (i.e.—during RESET).

When the security chip is active, the Folio consumes 40 mA at 5V (or 100 mA from the battery pack). Part of this is due to the 80C32, which remains awake throughout the communication sequence with the security chip. The security chip communication sequence typically takes less than two seconds.

d. LCD Module Power:

The power to the LCD module is controlled by Q5. When output bit 3 of U8 goes low, the PNP transistor 'turns on'. The base resistor R36 is 10K, which means that the base current will be about 0.4 mA. This means that we will only need a DC current gain of 3 from QS, which is well below the specified minimum of 100 (for a 2N3906 with a collector current of 10 mA). The pull-up resistor R14 is there to disable QS when the outputs of U8 are floating (i.e.—during RESET).

When the LCD module is active, it uses about 1.2 mA at 5V (or 3 mA from the battery pack). Because this current drain is so low, we tend to leave the LCD on as much as possible. Typically, the LCD module is 'turned on' and left on for the duration of the transaction; it is only 'turned off' after docking is completed.

e. Mag Card Reader Power:

The power to the mag card reader circuitry (page 4 of schematic) is controlled by Q4. When output bit 2 of U8 goes low, the PNP transistor 'turns on'. The base resistor R6 is 1K, which means that the base current will be about 4 mA. This means that we will only need a DC current gain of 5 from Q4, which is well below the specified minimum of 60 (for a 2N3906 with a collector current of 50 mA). The pull-up resistor R7 is there to disable Q4 when the outputs of U8 are floating (i.e.—during RESET).

When the mag card reader is active, the Folio consumes 40 mA at 5V (or 100 mA from the battery pack). Part of this is due to the 80C32, which remains awake throughout the card read sequence. The mag card read sequence typically takes less than 30 seconds.

f. IR Phototransistor Power:

The power to the IR phototransistor (Q1) is controlled by Q2. When output bit 1 of U8 goes low, the PNP transistor 'turns on'. The base resistor R2B is 10K, which means that the base current will be about 0.4 mA. This means that we will only need a DC current gain of 12 from Q2, which is well below the specified minimum of 100 (for a 2N3906 with a collector current of 10 mA). The pull-up resistor R27 is there to disable Q2 when the outputs of U8 are floating (i.e.—during RESET).

When the IR phototransistor is active, it uses about 4.8 mA at 5V (or 12 mA from the battery pack). Typically, the IR phototransistor is active only when IR communication is taking place. However, if the ambient light level is high enough, it will activate the IR phototransistor and use battery power needlessly. For this reason, the IR phototransistor is only 'turned on' when it is needed.

5. Power Supply: (FIG. 17D)

a. General Description:

The power supply converts the battery pack voltage into five volts. It is a Low Voltage Boost Regulator based on Micro Linear's 4861 chip. The ML4861 is a complete solution for DC to DC conversion in 1 to 3 cell battery powered systems. The circuit requires a minimum number of external components: one inductor, two capacitors, and one diode. The boost circuit of the ML4861 is capable of running with input voltages as low as 1V. Special care was taken in the design of the ML4861 to optimize system efficiency. Synchronous rectification provides lower forward voltage drop. The regulator operates using discontinuous boost and only starts an output pulse when the voltage has drooped. The regulator operates as a variable frequency system and only uses significant power when switching. The circuit also contains a RESET— output which goes low when the IC can no longer function due to low input voltage, or when the DETECT input drops below 200 mV. The ML4861 output is ±5% accurate. Typical efficiency is 80% for a 5V output with a 2.5V input.

b. Efficiency:

Efficiency of the regulator is dependent on several variables. Ferrite core material will exhibit lower core losses than inductors wound on powdered iron cores. Also, the larger the core size the lesser the amount of core and copper loss. Inductor core loss increases as input voltage is increased since peak current increases. However, core loss also decreases as switching frequency decreases. It is important to remember that inductors have tolerances as large as ±20%. Thus, losses due to different core materials and variations in actual inductance values from nominal values may result in variations in maximum output current and power conversion efficiency.

c. Inductor (L1):

The regulator must deliver the full output current required throughout the input voltage range with minimization in size and cost while maximizing efficiency. Optimization of the regulator means selecting the right inductor for the job. As an example, given a two cell application that requires 80 mA peak load current at 5V. Using NiCad batteries with a typical operating voltage of 1.2V and an end-of-discharge voltage of 1.0V, the output current curves for the ML4861-5.0, with Vin at 2.0V, shows that a 27 uH inductor can typically deliver about 100 mA of output current, which leaves 20% tolerance for variations in inductance and switch on-time.

d. Output Capacitor:

The output filter capacitor (C12) will limit the ripple on Vout. The value can be chosen based on the acceptable change in output voltage for a single inductor discharge cycle which is given by:

$$\text{Delta Vout} = (0.5 * \text{Vin} * 10\text{usec} * \text{Imax})/(C12*(\text{Vout}-\text{Vin}))$$

For Vin=3V, Vout=5V, Imax=0.5A, and C12=220 uF, the output ripple will be 17 mV. Capacitor equivalent series resistance (ESR) must also be considered when choosing a capacitor, both for ripple and efficiency. C3 was chosen for its very low ESR rating. Additional output filtering is provided by the Pi filter, which is made up of ferrites FB6, FB7 and capacitor C11.

e. Vref:

A 10 nF to 100 nF capacitor at the reference pin, Vref, may be necessary to filter out noise in high current situations. This is particularly true if ripple voltage is high at the input pin, Vin. This design uses a 0.1 uF capacitor (C16) at the reference pin.

f. Battery Monitoring:

For input battery voltages of IV or greater, the RESET— can be set to trigger low by putting a resistor divider across the battery with the divider tied to the DETECT pin. The trip voltage is set by determining the minimum battery voltage, Vbat(min), then solving for the two resistors. Choose one of the resistors to be relatively large to minimize power dissipation in the divider. In this design, we set Vbat(min) to be 2.4V. This value was chosen because it is at the beginning of the knee on the discharge curve for the NiCad battery pack. This ensures that we will have enough battery life to finish the current transaction. Given Vbat(min)=2.4V, we select one of the resistors to be 10K and solve for the other using the equation:

$$R=10K*((2.4V/0.2)-1)$$

Thus, for this example, R=110K. One or two percent resistors are recommended. In this design, R37 is 110K (one percent) and R38 is 10K (one percent). The pull-up resistor R22 is added to the RESET- output of the ML4861 to help out in the transition region of the comparator.

g. Input Filtering:

In order to protect the power supply from undesirable transients (like ESD), a two stage protection scheme is employed. The first stage consists of ferrites FB1, FB2 and capacitor Cl. This stage is physically located near the entry point, which is by the metal contacts on the outside of the Folio plastic case. The second stage consists of ferrites FB4, FB5 and capacitor C28. This stage is physically located near the input to the power supply, which is by the LCD module. In addition, there is a large capacitor (C13) on the input pin to the power supply itself.

h. Relay:

The function of the relay (K1) is to switch the battery terminals from the internal circuitry to the external contacts. When the Folio is inserted into the Charger, the Charger places +5V on J5. This causes the relay to switch the plus terminal of the battery pack. Before the relay is energized, the plus terminal of the battery pack is connected to the power supply section of the Folio. After the relay is energized, the plus terminal of the battery pack is connected to J7. The minus terminal of the battery pack is permanently connected to both the power supply section of the Folio and to J6. The relay is a high-sensitivity model and requires only 25 mA of current to energize.

6. Mag-Card Reader Section (FIG. 17C)

a. General:

The portable transaction terminal 10 has a two-track card reader which is normally set up for tracks 1 and 2. There is an optional configuration which supports tracks 2 and 3, but it has never been tested. In this design, we use the Nag-Tek 21006506 chip. The 21006506 F2F Read/Decode Integrated Circuit is intended for use in recovering F2F encoded data received from a magnetic head. Its features include a speed range from 150 bps to more than 12,000 bps and operation off of a single supply voltage (+5V).

b. Functional Description:

The 21006506 F2F Read/Decode IC will recover clock and data signals from an F2F data stream generated from a magnetic head. The IC will function for data rates from 150 to more than 12,000 bps. Acquisition and tracking of the data within this range is automatic. The 21006506 F2F Read/ Decode IC is composed of four functional sections:

The Linear Conditioning section raises the level of the magnetic head input signal, rejects common mode noise, conditions the signal, detects the signal, and provides a digital version of the signal for subsequent processing.

The Enable/Disable Counters provide initialization for the recovery section. Depending on the SELECT input, this circuit will delay either 8/9 or 16/17 input transitions before enabling the Bit Recovery system. The enable remains in effect until the disable counter system detects the absence of data.

The Bit Recovery section locks on to the data rate and performs the recovery of individual bits from the F2F data stream.

The Oscillator provides clock pulses for the Bit Recovery section and the Enable/Disable Counters.

c. Card Read Sequence:

The card read sequence is initiated by the O.S. It first applies power to the card reader circuitry and then waits for card read interrupts. When a card is swiped, the data and strobe lines will become active. Each time that a strobe line goes low, it generates an interrupt to the 80C32. Track 1 strobes generate interrupts on the INT1 input to the 80C32. Track 2 strobes generate interrupts on the INT0 input to the 80C32. Here is the card read sequence in detail:

MCP- (card present) goes low indicating that a card is being swiped.

At approximately the same time, MSTB1- and MSTB2- go low indicating that data is valid.

MSTB1- goes to AND gate U8C and causes the output to go low. MSTB2- goes to AND gate U20C and causes the output to go low.

The output of U8C going low causes an interrupt on INT1 of the 80C32. The output of U4C going low causes an interrupt on INT0 of the 80C32.

The interrupt causes the 80C32 to go out and read the Interrupt Port (see below). If it is an INT1, then it reads the bit for MDATA1-. If it is an INT0, then it reads the bit for MDATA2-.

The process continues until there are no more card read interrupts.

7. Interrupt Port:

a. General Description

The interrupt port is U10 (74HC244). It is used for reading the status bits that correspond to various interrupts. Here is a list of the status bits:

Data bit 0=MDATA1- (data bit from Track 1 of the card reader)
   Data bit 1=MCP- (card present signal from card reader)
   Data bit 2=MSTB1- (strobe bit from Track 1 of the card reader)
   Data bit 3=BATLOW- (low battery status from power supply comparator)
   Data bit 4=I/O 2 (serial communication link from security chip)
   Data bit 5=KEYINT- (keyboard status bit from key matrix)
   Data bit 6=MSTB2- (strobe bit from Track 2 of the card reader)
   Data bit 7=MDATA2- (data bit from Track 1 of the card reader)

The enable input for U10 is generated by U6. The output of U6 which connects to the enable input of U10 is Y0. The Y0 output is active low. The conditions for enabling the Y0 output are (A13=0 and A14=0 and A15=0) and (RD or WR). In other words, it has to be a data space read or write command within the address range of 0000 to 1FFF.

b. Timing:

The timing is very critical for reading the mag card data. The two tracks are independent of each other and are completely asynchronous. Track 1 is the high density track, so it has the most stringent requirements on the timing. At the highest data rate, which is 12,000 bits per second, each bit takes approximately 83 microseconds. The worst case scenario is where we get a Track 2 interrupt followed immediately by a Track I interrupt. In this scenario, we need to make sure that we finish the Track 2 interrupt in time to get the Track 1 data. This implies that the interrupt routines cannot be longer than 40 microseconds each. In practice, the requirement is not quite this tight because we do not have to completely finish the second interrupt routine in order to read the Track 1 data.

c. Buffer:

The buffer chip U3 (74HC373) is necessary in order to keep the interrupt lines from being held low when the card reader circuitry is powered off. The Mag Tek chip digital lines cannot be held high with pull-up resistors when the Mag Tek chip is powered off (even values of 1K do not provide enough of a pull-up to guarantee a 'logic one'). The buffer chip output control is generated by MAGVCC-. When there is power to the card reader circuitry, this signal is low and the outputs are enabled. When there is no power to the card reader circuitry, this signal is high and the outputs are floating. The pull-up resistors hold the outputs in a high state so that the AND gates U18C and U4C will still allow interrupts to get through (from the keyboard and security chip). The pull-up resistor R10 holds the enable line high, as well as holding the unused inputs in a known state.

8. Keyboard Section (FIG. 17E)

a. Overview:

The keyboard is always active. When a key is pressed, it sends an interrupt to the 80C32. The 80C32 reads the Keyboard Port to get the row and column information for the key. The interrupt is generated by a switch and will have bounce. The interrupt service routine should disable interrupts during the debounce period. The row and column information is identical to that used in the PIN Pad 176. As a matter of fact, we often use the PIN Pad 176 keyboard as a substitute when the membrane keyboards are in short supply.

b. Keyboard Port:

The keyboard port is U5 (74HC244). The enable for U5 is generated by U6. The output of U6 which connects to the enable input of U5 is Y1. The Y1 output is active low. The conditions for enabling the Y1 output are (A13=1 and A14=0 and A15=0) and (RD or WR). In other words, it has to be a data space read or write command within the address range of 2000 to 3FFF. Here are the bit assignments for the keyboard port:

| Connector JP7 Pins | Description | Data Bus Bit # |
|---|---|---|
| Pin 1 | ROW 4 (cancel, 0, clear, enter) | 0 |
| Pin 2 | open (no connection) | |
| Pin 3 | COL 1 (1, 4, 7, cancel) | 4 |
| Pin 4 | ROW 3 (7, 8, 9, f1) | 1 |
| Pin 5 | ROW 2 (4, 5, 6, right blue key) | 2 |
| Pin 6 | ROW 1 (1, 2, 3, left blue key) | 3 |
| Pin 7 | COL 2 (2, 5, 8, 0) | 5 |
| Pin 8 | COL 3 (3, 6, 9, clear) | 6 |
| Pin 9 | ground | |
| Pin 10 | COL 4 (left blue key, right blue key, f1, enter | 7 | c. Key Detection:

The keyboard matrix is organized such that when a key is pressed, three contacts are shorted together: a row, a column, and ground. When there is no key pressed, the keyboard lines are all held high by pull-up resistors. The keyboard lines corresponding to the four rows also connect to AND gates U4A,B, and D. Whenever a key is pressed, the active low signal on the row lines causes the output of U4D to go low. This signal feeds into U4C and causes an interrupt on the INT0 input of the 80C32. When the 80C32 gets an interrupt, it checks the Interrupt Port to determine the source of the interrupt. Once it has determined that the interrupt came from the keyboard (by checking bit 5 of the interrupt port), the 80C32 reads the Keyboard Port and gets the row/column information for that key.

9. Security Chip Section (FIG. 17F)

a. General Description:

The Philips 83C852 single chip secured microcontroller is manufactured in an advanced 1.2 micron CMOS process. It is a derivative of the 80C51 microcontroller family and has the same instruction set as the 80C51. It has been specially designed for conditional access in secure Smart Card applications and is implemented with the highest levels of security. Its internal calculation unit speeds-up cryptographic calculations using Public Key Algorithms.

External communications can be performed through a serial interface (I/O) according to ISO standards. The serial interface must be controlled by application software for access to the 83C852 internal memory. The 83C852 contains a 6K bytes READ only memory (user ROM); a 256 bytes READ/WRITE data memory (RAM); 2K bytes electrically erasable programmable READ only memory (EEPROM); two I/O lines; two 16-bit timers; five vectorized interrupt sources; 33 Special Function Registers (SFRs); and a Calculation Unit to speed-up the execution time of public keys and secret keys cryptographic algorithms.

The 83C852 operates with a single 5V power supply and at a maximum clock frequency of 6 MHz. The instruction set consists of over 100 instructions: 49 one-byte, 45 two-byte, and 17 three-byte. With an input clock frequency of 6 MHz, 58% of the instructions are executed in 1 microsecond and 40% in 2 microseconds.

b. Pin Descriptions:

Vdd The +5V power supply pin during normal operation, idle mode, and power-down mode.

RESET- Active low input that initializes the processor.

CLK External clock input. The internal clock frequency equals the external clock frequency.

Vss Ground.

I/O 1 Quasi bi-directional port (TTL compahandle an e user's program must include routines able to handle an asynchronous serial communication through a single I/O port (for half duplex).

I/O 2 Quasi bi-directional port (TTL compatible).

c. Communications:

The 80C32 communicates with the 83C852 through two bit-banged serial lines. I/O 1 goes from the 80C32 to the 83C852 and I/O 2 goes from the 83 C852 to the 80C32. The serial link operates at 1200 BAUD. The timing is critical for this bit-banged serial link. Special care must be taken to sample the bits in the middle of the bit width. This can be verified by using a bit on the 80C32 to serve as a timing marker. Any change in the crystal frequency for either of the processors would mean going back and adjusting the timing of the bit-bang serial communications routines.

I/O 1 is driven directly from the T1 output on the 80C32. I/O 2 goes into the T0 input on the 80C32, goes into AND gate U18C. The output of U18C going low causes an interrupt on the INT1 input of the 80C32. This interrupt starts a timer which eventually causes the bit to be read (in the middle of the bit width). The I/O 2 line is interrupted by Q9 when the security chip is powered down. Pull-up resistor R64 holds the input to U18C high, so that the mag card reader interrupts can still get through.

d. Oscillator:

The oscillator produces a clock at 6 MHz, The 6 MHz crystal (Y1) is in the feedback path of inverter Ul4F. The inverter is a 74HCU04, which has special gain characteristics for oscillator applications. The crystal is parallel resonant and requires two capacitors that are 33 pF each (C35 and C40). The diode (D5) allows the oscillator to be shut down whenever power is removed from the security chip. The oscillator uses quite a bit of current running at 6 MHz through the 74HCU04. The inverter U14E produces the clock which is fed into the 83 C852. The value of R58 was chosen to be 1.8K after consulting with a crystal manufacturer on how to avoid start-up problems in the oscillator.

Portable transaction terminal 10: Application Software Preferred Embodiment (FIGS. 22 and 23)

Figure 22:
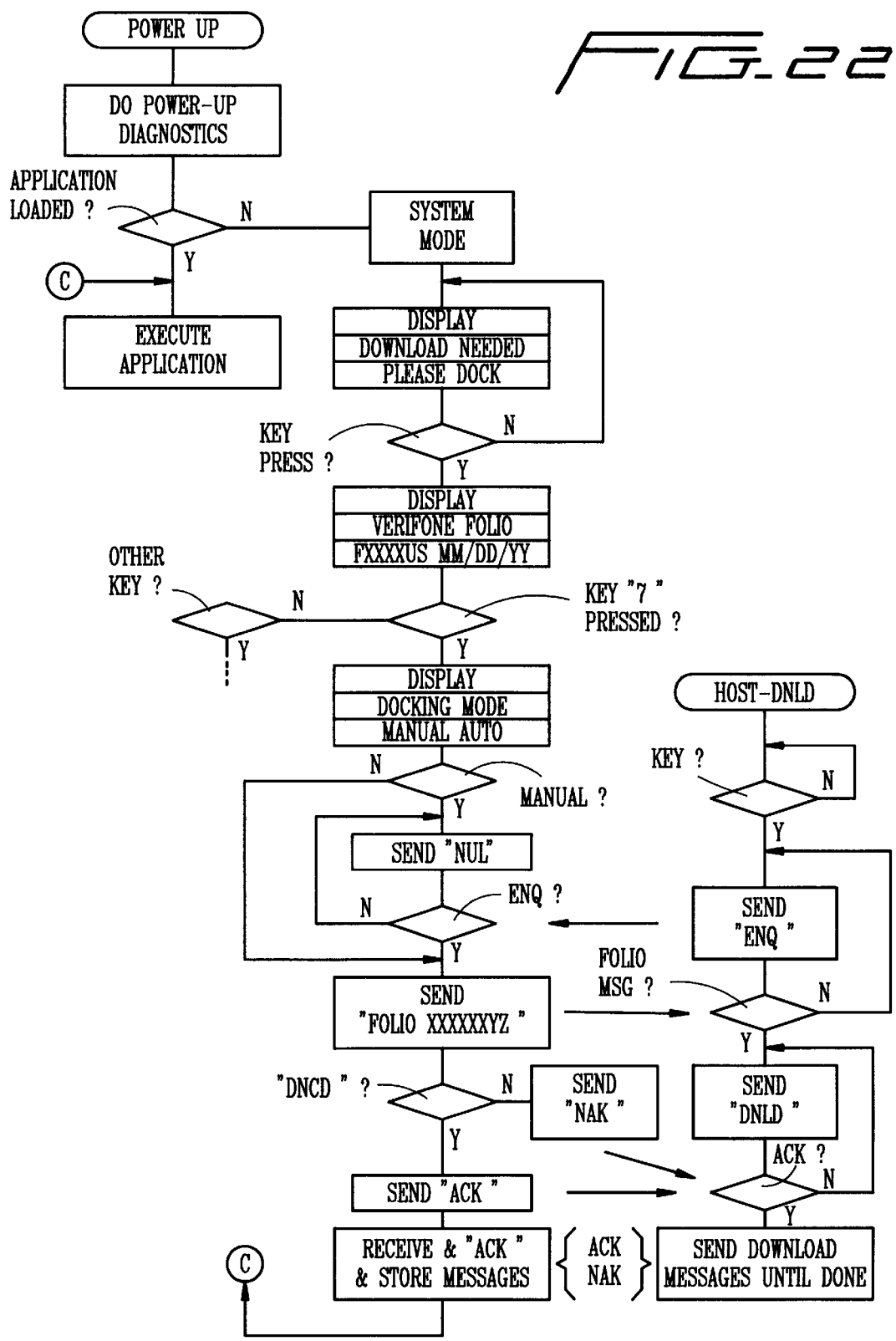
FIG. 22 is a software flow chart illustrating a sequence of operation steps for a power up routine for a portable transaction terminal in accordance with this invention.
Figure 23:
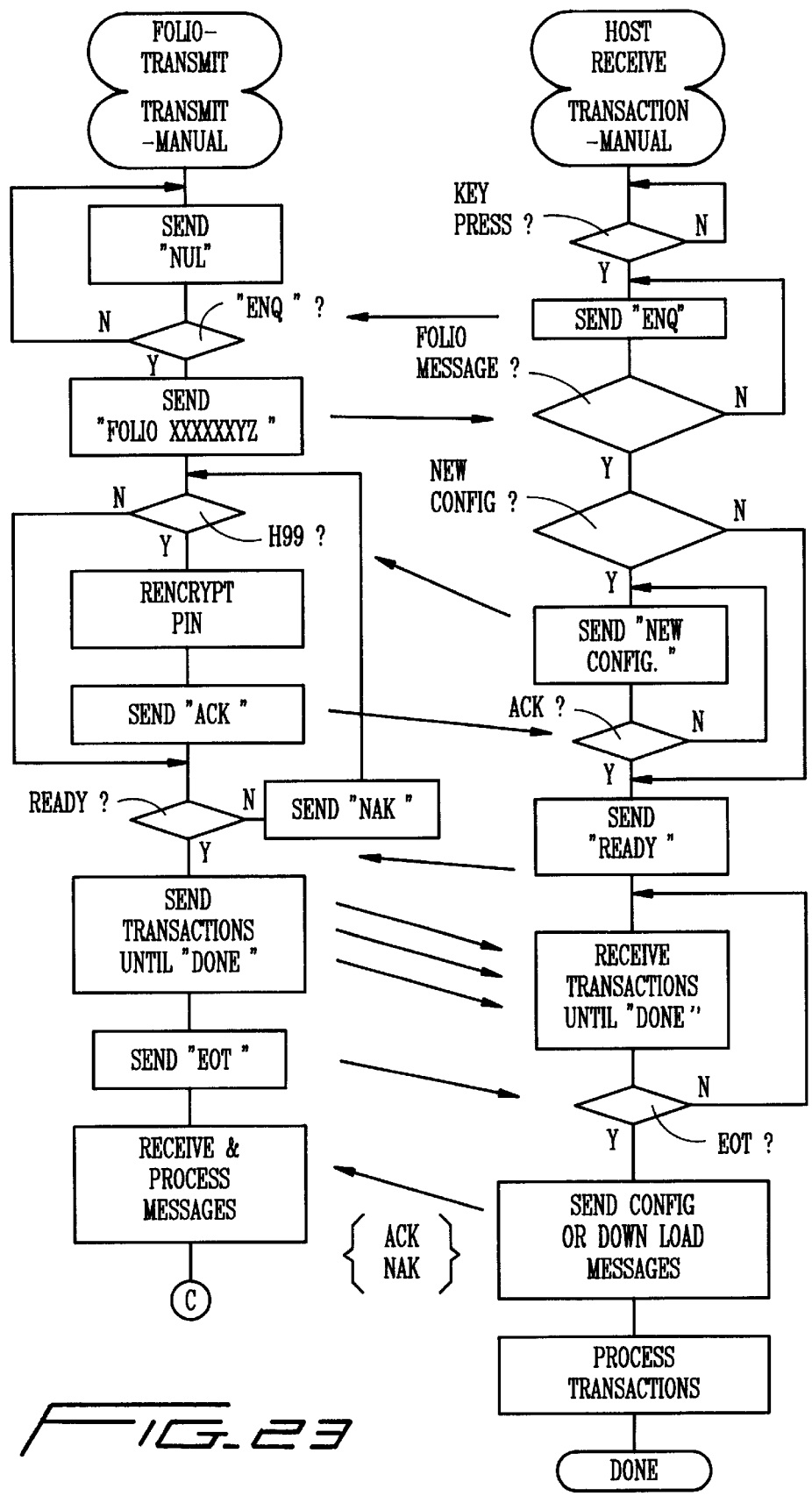
FIG. 23 is a software flow chart illustrating a sequence of operation steps for communicating transaction data from a portable transaction terminal in accordance with this invention to a transaction terminal.

Referring now to FIG. 22, the power up routine of the operating system software of a preferred embodiment of this invention will be described. On power up a set of diagnostic routines is first performed and then a check is made to determine if application software has been loaded into the unit. If this returns YES, then execution of the application software is initiated, e.g. the routine for data entry shown in FIG. 21. If this step returns NO, then system mode is entered and the display activated to display the message

DOWNLOAD NEEDED
PLEASE DOCK

The portable transaction terminal 10 must then be docked in a docking station 20 connected to a transaction terminal or computer capable of downloading a prearranged application program for the portable transaction terminal. In response to a key press, the terminal displays the message:

VERIFONE FOLIO

Fxxxxxxyz mm/dd/yy

In system mode the numeric keypad becomes a collection of function keys. Key 7 is pressed to perform a download. The terminal then displays the message:

DOCKING MODE
MANUAL AUTO

If manual is selected by pressing the related display labeled function key, then the unit starts sending NUL data until the host computer or system performing the download sends an ENQ. If AUTO is selected, the terminal starts sending the Folio message. The host receives the Folio message and sends a DNLD signal when it is ready to start downloading the application.

The terminal receives the DNLD message and sends an ACK which the host computer receives and responds to by sending download messages comprising the application until the download is complete. The terminal receives the message and processes and stores them in the application program section of RAM memory. The terminal then switches to point C to execute the downloaded application.

Transaction Data Communication (FIG. 23)

After transaction data has been entered into portable transaction terminal 10, e.g. using the steps shown in FIG. 22, the portable transaction terminal is inserted into docking station 20. Depending on the selected mode of data communication: manual or automatic, the terminal will either send out NUL until the host sends an ENQ in response to a keypress (Manual mode—as shown) and then send the Folio message, or in the automatic mode, will start sending the Folio message when transaction data entry is complete.

The host transaction terminal receives the Folio message and checks to see if it needs to send a new configuration to the terminal. If the checking step returns YES, then a new configuration is sent. If the terminal determines that this is a new working key for PIN encryption, it re-encrypts the PIN and sends an ACK. The host transaction terminal then sends a READY message and the terminal responds by sending transaction packets via the IR port until it is done and then sends an EOT to the host transaction terminal. After upload of all transaction packets, the host transaction terminal may take over and send other configuration or applications software download messages to the terminal. After any reconfiguration or new download is processed by the terminal, it returns to execution of the current stored application software.

While all the details of an embodiment of operating system firmware and application software have not been included herein, those of skill in this art will appreciate that such details are well within the skill of the average programmer of ordinary skill in the art to provide using the general operating and performance description given above.

While both general and specific embodiments of the portable transaction terminal of this invention and related system components have been described, it should be understood that this invention is not limited to such embodiments and numerous changes could be made by persons skilled in the art without departing from the spirit and scope of the invention as claimed in the following claims.

What is claimed is:

1. Portable transaction terminal system adapted for use in an eating and drinking establishment, including a portable transaction terminal apparatus comprising:

a terminal housing having a generally rectangular shape and of size slightly larger in length and width to corresponding dimensions of a restaurant guest check, a folio cover mounted to a left side portion of said terminal housing by a hinge arrangement and thereby adapted to swing between open and closed cover positions, said cover corresponding in length and width to said terminal housing so as to completely cover a top face of said terminal housing in said closed cover position and to lie flat against a surface in said open cover position, a data entry keypad and an alphanumeric display carried on said top face of said terminal housing, a card reader module mounted in said terminal housing for accepting and reading a transaction data card selected for use by a guest of the establishment for payment of the amount of the guest check, a microcomputer system carried within said terminal housing and being pre-programmed with operating system and application software for management of data entry, message display, card reading and transaction message formatting and storing functions associated with a preselected data entry sequence and data message format, and including a data communication means for communicating a transaction data message to an external transaction terminal system for completion of transaction processing steps;

said terminal housing including a battery compartment carrying a rechargeable battery to provide power therefor, and an arrangement of charging contact elements carried in a prearranged position on a selected one of a front edge and back edge of said terminal housing for applying recharging voltage and current to said rechargeable battery, and said system further including a battery charger unit comprising a charger housing defining at least one cavity adapted for close insertion of said terminal housing with said cover in said closed cover position and in a single predetermined orientation dictated by said hinge arrangement, said cavity having a cavity bottom surface with an arrangement of spring mounted charger contact elements carried thereon and positioned to contact said charging contacting elements on said terminal housing when fully inserted into said cavity, and a charge control circuit mounted in a base portion of said charger housing and powered by a power supply module for intelligently controlling the charging of said rechargeable battery, said charge control circuit including charge state monitoring means and charge state display means for indicating the operation of said battery charger unit and the charge state of said rechargeable battery.

2. System as claimed in claim 1, wherein said charger housing defines a plurality of separated cavities each adapted for close insertion of a terminal housing each of said cavities having a cavity bottom surface with an arrangement of spring mounted charger contact elements carried thereon and positioned to contact said charging contacting elements on a terminal housing when fully inserted into said cavity, and a charge control circuit mounted in a base portion of said charger housing underneath said cavity and adapted to be powered by a DC power supply module for intelligently controlling the charging of said rechargeable battery, said charge control circuit including charge state monitoring means and charge state display means communicating through an aperture in said base portion of said charger housing for indicating the operation of said battery charger unit and the charge state of said rechargeable battery, and said battery charger unit further comprises an AC-DC power supply module mounted in a base portion of said charger housing and having a DC power output connected via a cable to each of said charge control circuits and a POWER ON/OFF indicator light communicating through said base portion of said charger housing.

3. Portable transaction terminal system adapted for use in an eating and drinking establishment, including a portable transaction terminal apparatus comprising:

a terminal housing having a generally rectangular shape and of size slightly larger in length and width to corresponding dimensions of a restaurant guest check, a folio cover mounted to a left side portion of said terminal housing by a hinge arrangement and thereby adapted to swing between open and closed cover positions, said cover corresponding in length and width to said terminal housing so as to completely cover a top face of said terminal housing in said closed cover position and to lie flat against a surface in said open cover position, a data entry keypad and an alphanumeric display carried on said top face of said terminal housing, a card reader module mounted in said terminal housing for accepting and reading a transaction data card selected for use by a guest of the establishment for payment of the amount of the guest check, a microcomputer system carried within said terminal housing and being pre-programmed with operating system and application software for management of data entry, message display, card reading and transaction message formatting and storing functions associated with a preselected data entry sequence and data message format, and including a data communication means for communicating a transaction data message to an external transaction terminal system for completion of transaction processing steps;

said data communication means being an optical serial data communication means comprising an optical transmitter element and an optical receiver element, said optical transmitter element and receiver element being mounted on a circuit board within said terminal housing near a selected one of a front edge and a back edge of said terminal housing and being covered by an optical window carried on said selected edge of said terminal housing, and said system further includes a docking station and said portable transaction terminal apparatus is adapted for being mated to said docking station for communicating with a point of sale transaction terminal, said docking station comprising a docking station housing defining at least one cavity adapted for close coupled insertion of said terminal housing with said cover thereof in said closed cover position and in a single predetermined orientation dictated by said hinge arrangement, said cavity having a cavity bottom surface with an optical window carried thereon at a position to be in registration with said optical window on said terminal housing when fully inserted into said cavity, a docking station circuit board mounted in a base portion of said docking station housing and having mounted thereon an optical transmitter and optical receiver in position adjacent said optical window in said cavity bottom surface for optical communication with corresponding optical transmitter and optical receiver elements in said portable transaction terminal apparatus, said circuit board further having electronic circuits providing full-duplex RS-232 serial data communication for coupling to an RS-232 serial port of a point-of-sale transaction terminal and a power supply circuit receiving operating power from the point-of-sale transaction terminal.

4. System as claimed in claim 3, wherein said optical transmitter elements are infrared LED elements and said optical receiver elements are infrared phototransistors, and further comprising a visible LED coupled in series with said infrared LED element in said terminal housing and positioned to emit visible light through said optical window in said wall of said terminal housing to serve as a wait person call signal output from said portable transaction terminal apparatus.

5. System as claimed in claim 3, wherein said microcomputer system of said portable transaction terminal apparatus stores in memory a terminal configuration message and is programmed to operate in a selectable one of two transaction data communication modes with a point-of-sale transaction terminal comprising a manual mode and an automatic mode, said automatic mode comprising the steps of:
repetitively sending out over said optical data transmitter said terminal configuration message until said optical data receiver receives from said point-of-sale transaction terminal an ACK message followed by a READY message indicating readiness to receive a transaction data packet responding to receipt of said READY message by sending a transaction data packet over said optical data transmitter to said point-of-sale data terminal, responding to an ACK message from said point-of-sale transaction terminal by sending the next transaction data packet or an EOT if no more packets are stored in the portable transaction terminal apparatus;

and said manual mode comprising the steps of:

repetitively sending out over said optical data transmitter a NUL message until said optical data receiver receives from said point-of-sale transaction terminal an ENQ message sent in response to manual pressing of a key on said point-of-sale transaction terminal, sending said terminal configuration message to said point-of-sale transaction terminal, responding to receipt of an ACK message from said point-of-sale transaction terminal followed by a READY message by responding to receipt of said READY message by sending a transaction data packet over said optical data transmitter to said point-of-sale data terminal, and responding to an ACK message from said point-of-sale transaction terminal by sending the next transaction data packet or an EOT if no more packets are stored in the portable transaction terminal apparatus.

6. Portable transaction terminal apparatus specially adapted for use in eating and drinking establishments and comprising, in combination:

a terminal housing having a generally rectangular shape and of size and weight adapted to be carried in a server's apron pocket, a data entry keypad carried on a top face of said terminal housing and comprising a moisture impervious sealed keypad adhesively mounted on said top face and connected to a keysignal cable extending through an aperture in said top face underneath said sealed keypad, an alphanumeric display module mounted on a electronic circuit board carried within said terminal housing with a display region of said display module communicating through an aperture in said top face of said terminal housing, said aperture being sealed on said top face of said terminal housing by a moisture impervious transparent cover member adhesively secured to the top face of said terminal housing, a card reader module mounted in said terminal housing for accepting and reading a transaction data card selected for use by a guest of the establishment for payment of the amount of the guest check, said card reader module being mounted to said terminal housing and having a card entry slot defined by at the proximal end of a card guide bottom member which slopes inwardly and downwardly away from said top face of said terminal housing, said card guide bottom member having a distal end extending through an aperture in said electronic circuit board carried within said terminal housing and communicating with an aperture in a bottom face of said terminal housing to channel any spilled liquids entering said card guide all the way through said interior of said terminal housing to exit through said aperture in said bottom face thereof, a microcomputer system carried within said terminal housing on said electronic circuit board and being pre-programmed with operating system and application software for management of data entry, message display, card reading and transaction message formatting and storing functions associated with a preselected data entry sequence and data message format, and including a data communication means for communicating a transaction data message to an external transaction terminal system for completion of transaction processing steps.

7. Transaction terminal apparatus comprising, in combination:

a terminal housing;

a data entry keypad mounted to said terminal housing;

an alphanumeric display mounted to said terminal housing;

a drop-in magnetic stripe card reader module mounted within said terminal housing and including a card accepting slot defined in an outside wall region of said terminal housing;

a microcomputer system carried within said terminal housing on said electronic circuit board and being pre-programmed with operating system and application software for management of data entry, message display, and card reading functions, said card reader module comprising:
a card guide bottom member and a card guide top member mounted together to define the entire bottom wall of a card guide and at least a major portion of a top wall thereof;
a magnetic read head for reading at least one data stripe on a magnetic stripe card, and a head mounting member for carrying said magnetic read head and adapted for mounting to a bottom wall of said card guide in a registered position thereon;

said bottom wall of said card guide having a length greater than the length of a magnetic stripe card to be inserted therein and having a front facing slot defined therein for receiving the fingers of a hand inserting a magnetic stripe card and thereby enabling full insertion of said card, said bottom member having an aperture therein adjacent said slot for receiving a front portion of a magnetic read head and enabling a data pick up element on the face thereof to contact a magnetic stripe on a card inserted in said card guide, said head mounting member having an aperture therein for receiving said magnetic pick up head, a cantilevered head support and spring bias element being integrally formed on a back portion of said head mounting member and extending behind said aperture for supporting said magnetic head therein and biasing said head toward a top surface of said card guide when said head mounting member is mounted to said card guide and said front portion of said magnetic read head is received in said aperture of said card guide;

said bottom member and said head mounting member having cooperating position registration elements for accurately mounting said head mounting member relative to a side wall of said card guide so that said magnetic read head carried thereon will be aligned with a data stripe on a magnetic stripe card inserted in said card slot.

8. Apparatus as claimed in claim 7, adapted for reading two of three possible data tracks in defined track locations on a magnetic stripe card, and wherein said read head is a dual track read head with pick-up elements spaced for pickup of data on two adjacent data tracks, said cooperating position registration elements define two separate registered mounting positions for said head mounting member to position said magnetic read head for reading a selected pair of said adjacent data tracks, and said head mounting member is fastened to said bottom member with a single fastener element on one end and being held in position by a hook element on said bottom member on the other end thereof.

9. Apparatus as claimed in claim 8 wherein said cooperating position registration elements comprise a series of four tongue elements on said bottom member and three groove elements on said head mounting member to define two accurately registered mounting positions for said head mounting member.

10. Portable transaction terminal system adapted for use in an eating and drinking establishment, including a portable transaction terminal apparatus comprising:

a terminal housing having a generally rectangular shape and of size slightly larger in length and width to corresponding dimensions of a restaurant guest check, a folio cover mounted to a left side portion of said terminal housing by a hinge arrangement and thereby adapted to swing between open and closed cover positions, said cover corresponding in length and width to said terminal housing so as to completely cover a top face of said terminal housing in said closed cover position and to lie flat against a surface in said open cover position, a data entry keypad and an alphanumeric display carried on said top face of said terminal housing, a card reader module mounted in said terminal housing for accepting and reading a transaction data card selected for use by a guest of the establishment for payment of the amount of the guest check, a microcomputer system carried within said terminal housing and being pre-programmed with operating system and application software for management of data entry, message display, card reading and transaction message formatting and storing functions associated with a preselected data entry sequence and data message format, and including a data communication means for communicating a transaction data message to an external transaction terminal system for completion of transaction processing steps;

said microcomputer system being carried on one or more electronic circuit boards mounted within said terminal housing in a position spaced a short distance above an inside back surface of said terminal housing, said card reader module including card reader electronics carried on one of said electronic circuit boards and a drop-in card reader mounted to said terminal housing and to said one of said electronic circuit boards;

said drop-in card reader having a card guide bottom member mounted to said one of said electronic circuit boards and cooperating with wall surface portions on said top face of said terminal housing to form a card entry slot at the proximal end of said bottom card guide member, a bottom wall of said card guide bottom member being formed to slope inwardly and downwardly away from said top face of said terminal housing to provide a convenient insertion angle for said transaction data card, said card guide bottom member having a distal end extending through an aperture in said electronic circuit board on which it is mounted to communicate with and be received in an aperture in a bottom face of said terminal housing and thereby channelling any spilled liquids entering said card guide all the way through the interior of said terminal housing to exit through said aperture in said bottom face thereof and thereby prevent contamination of the electronic circuitry within said terminal housing.

11. System as claimed in claim 10, wherein said data entry keypad is carried on a top face of said terminal housing and comprises a moisture impervious sealed keypad adhesively mounted on said top face and connected to one of said electronic circuit boards via a keysignal cable extending through an aperture in said top face underneath said sealed keypad to prevent any liquid spilled on said terminal housing when said cover is in a open cover position from entering said terminal housing through said data entry keypad, said alphanumeric display module is mounted on a electronic circuit board carried within said terminal housing with a display region of said display module communicating through an aperture in said top face of said terminal housing, said aperture being sealed on said top face of said terminal housing by a moisture impervious transparent cover member adhesively secured to the top face of said terminal housing, to prevent any liquid spilled on said terminal housing when said cover is in a open cover position from entering said terminal housing through said alphanumeric display.

12. System as claimed in claim 10, wherein
said terminal housing has a recess formed therein at the mounting location of said card reader module adapted to receive the fingers of a person's hand during insertion of said transaction data card,
said wall surface portions on said top face of said terminal housing forming a proximal portion of a card guide top surface and said card guide bottom member defining similar recesses for admitting fingers of a person's hand during insertion of said transaction data card, and
said card reader module further comprises:
- a card guide top member mounted on said card guide bottom member and forming the distal portion of a top wall of a card guide, a forward facing surface of said card guide top member having a notched region corresponding to the embossed data area on a transaction data card and thereby determining a single card insertion orientation.

13. System as claimed in claim 12, wherein said transaction data card is a magnetic stripe card and said card reader module further comprises:
- a magnetic read head for reading at least one data stripe on said magnetic stripe card, and
- a head mounting member for carrying said magnetic read head and adapted for mounting to a bottom wall of said card guide bottom member in a registered position thereon;

said card guide bottom member having an aperture therein adjacent said recess for receiving a front portion of a magnetic read head and enabling a data pick up element on the face thereof to contact a magnetic stripe on a card inserted in said card guide, said head mounting member having an aperture therein for receiving said magnetic pick up head, a cantilevered head support and spring bias element being integrally formed on a back portion of said head mounting member and extending behind said aperture for supporting said magnetic head therein and biasing said head toward a top surface of said card guide when said head mounting member is mounted to said card guide bottom member and said front portion of said magnetic read head is received in said aperture therein, said card guide bottom member and said head mounting member having cooperating position registration elements for accurately mounting said head mounting member relative to a side wall of said card guide so that said magnetic read head carried thereon will be aligned with a data stripe on a magnetic stripe card inserted in said card slot.

* * * * *